(12) United States Patent
Mabuchi

(10) Patent No.: US 9,577,997 B2
(45) Date of Patent: Feb. 21, 2017

(54) AUTHENTICATION SYSTEM AND AUTHENTICATION METHOD

(75) Inventor: Mitsuhiro Mabuchi, Tokyo (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 178 days.

(21) Appl. No.: 14/399,224

(22) PCT Filed: May 29, 2012

(86) PCT No.: PCT/JP2012/063794
§ 371 (c)(1),
(2), (4) Date: Nov. 6, 2014

(87) PCT Pub. No.: WO2013/179392
PCT Pub. Date: Dec. 5, 2013

(65) Prior Publication Data
US 2015/0095997 A1    Apr. 2, 2015

(51) Int. Cl.
G06F 7/04        (2006.01)
G06F 15/16       (2006.01)
(Continued)

(52) U.S. Cl.
CPC .............. *H04L 63/068* (2013.01); *B60R 25/20* (2013.01); *H04L 9/0891* (2013.01);
(Continued)

(58) Field of Classification Search
CPC .... H04L 63/068; H04L 63/08; H04L 2209/84; H04L 9/08; H04L 9/0891; H04L 29/06; B60R 25/20; G07C 5/085; G06F 7/04; G06F 15/16; G06F 17/30
See application file for complete search history.

(56) References Cited

U.S. PATENT DOCUMENTS 5,577,122 A * 11/1996 Schipper ................. G01S 19/07
                                                      342/357.31
5,708,712 A *  1/1998 Brinkmeyer ............ B60R 25/04
                                                      340/5.25

(Continued)

FOREIGN PATENT DOCUMENTS

JP      2001005784 A  *  1/2001
JP      2001-036522 A     2/2001
(Continued)

OTHER PUBLICATIONS

Albert Wasef et al: "REP: Location Privacy for VANETs Using Random Encryption Periods", Mobile Networks and Applications, Kluwer Academic Publishers, BO, vol. 15, No. 1, May 27, 2009, pp. 172-185, XP019773132, ISSN: 1572-8153.

(Continued)

*Primary Examiner* — Jayesh Jhaveri
(74) *Attorney, Agent, or Firm* — Sughrue Mion, PLLC

(57) ABSTRACT

On-vehicle control units include an attaching section for attaching a message code used to check the validity of the transmission source of communication data, to the communication data. The on-vehicle control units also include an update section for updating a key code and the message code every time communication of communication data has been completed. An authentication section checks communication data and the transmission source thereof on the basis of the result of comparison between the random code obtained by restoring a message code and the random code owned by the on-vehicle control units, which are authorized.

9 Claims, 14 Drawing Sheets

(51) Int. Cl.
  *G06F 17/30* (2006.01)
  *H04L 29/06* (2006.01)
  *B60R 25/20* (2013.01)
  *H04L 9/32* (2006.01)
  *H04L 29/08* (2006.01)
  *G07C 5/08* (2006.01)
  *H04L 9/08* (2006.01)

(52) U.S. Cl.
  CPC ............ *H04L 9/3226* (2013.01); *H04L 63/08* (2013.01); *H04L 63/126* (2013.01); *H04L 67/12* (2013.01); *G07C 5/085* (2013.01); *H04L 9/08* (2013.01); *H04L 2209/84* (2013.01)

(56) References Cited

U.S. PATENT DOCUMENTS

| | | | | |
|---|---|---|---|---|
| 5,754,657 | A * | 5/1998 | Schipper | G01S 19/16 342/357.29 |
| 6,148,404 | A * | 11/2000 | Yatsukawa | G06F 21/335 380/30 |
| 6,354,120 | B1 * | 3/2002 | Tan | B60R 25/02153 70/239 |
| 8,798,852 | B1 * | 8/2014 | Chen | G06F 21/44 701/29.6 |
| 2005/0086493 | A1 * | 4/2005 | Ishidoshiro | G06F 21/34 713/182 |
| 2005/0172118 | A1 * | 8/2005 | Nasu | G03G 21/04 713/156 |
| 2006/0107285 | A1 * | 5/2006 | Medvinsky | H04N 7/1675 725/25 |
| 2006/0238296 | A1 * | 10/2006 | Konno | B60R 25/02 340/5.61 |
| 2007/0005197 | A1 * | 1/2007 | Ito | B60R 25/00 701/1 |
| 2010/0241857 | A1 * | 9/2010 | Okude | B60R 25/24 713/168 |
| 2012/0216286 | A1 * | 8/2012 | Johnson | G06F 21/64 726/26 |
| 2013/0063244 | A1 * | 3/2013 | Raed | B60R 25/24 340/5.8 |
| 2013/0160086 | A1 * | 6/2013 | Katar | H04L 63/08 726/4 |

FOREIGN PATENT DOCUMENTS

| | | | |
|---|---|---|---|
| JP | 2001036522 | A * | 2/2001 |
| JP | 2002109593 | A * | 4/2002 |
| JP | 2007188375 | A | 7/2007 |
| JP | 2009123059 | A * | 6/2009 |
| JP | 2010041411 | A * | 2/2010 |
| JP | 2011-020475 | A | 2/2011 |
| JP | 2011164729 | A * | 8/2011 |
| JP | 2013-098719 | A | 5/2013 |
| WO | 2009028060 | A1 | 3/2009 |

OTHER PUBLICATIONS

Dennis K. Nilsson et al., "Efficient In-Vehicle Delayed Data Authentication Based on Compound Message Authentication Codes," IEEE 68th VTC 2008-Fall, 2008, pp. 1-5.

* cited by examiner

AUTHENTICATION SYSTEM AND AUTHENTICATION METHOD

CROSS REFERENCE TO RELATED APPLICATIONS

This is a National Stage of International Application No. PCT/JP2012/063794 filed May 29, 2012, the contents of which are incorporated herein by reference in its entirety.

FIELD OF THE DISCLOSURE

The present invention relates to an authentication system and an authentication method that are advantageous when used, for example, by an on-board controller, which is installed in a vehicle, to perform authentication.

BACKGROUND OF THE DISCLOSURE

Recent vehicles such as automobiles include on-board controllers that configure navigation systems and on-board controllers that electronically control various types of on-board devices such as an engine, brake, and the like. A vehicle includes many on-board controllers such as an on-board controller that controls a device such as a meter, which shows various states of the vehicle. The on-board controllers are electrically connected by a communication line to form a vehicle network, and various types of vehicle data are transmitted and received between the on-board controllers through the vehicle network.

In a vehicle such as an automobile that is nowadays highly computerized, to determine whether or not the user who is using the vehicle or the various types of on-board devices in the vehicle is an authorized user, authentication is performed with an authentication key used to exchange an encryption code between the vehicle and the on-board device. Alternatively, user authentication is performed using a predetermined password.

In order to maintain security, the authentication key used for such authentication has to be possessed only by the user or device having the correct authorization. For example, as described in patent document 1, a system may encrypt a private key, which is used for authentication, with a key that is held in advance at a distributing destination of the private key, and distribute the encrypted private key to the distributing destination.

As shown in FIG. 14, in such a system, an on-board device center key 22, which is a key unique to a vehicle 1, is written in advance by a write device 18 to the vehicle 1, which is the distributing destination of a private key 16 used for authentication. An electronic key center key 23 unique to an electronic key 2 is also written in advance by the write device 18 to the electronic key 2, which is the distributing destination of the private key 16.

A center 20 for generating and distributing the private key 16 holds, in advance, the on-board device center key 22 and the electronic key center key 23 respectively held by the vehicle 1 and the electronic key 2. When distributing the private key 16, the center 20 uses the on-board device center key 22, which is a key shared with the key held by the vehicle 1, to encrypt the private key 16 that is distributed to the vehicle 1. The center 20 also uses the electronic key center key 23, which is a key shared with the electronic key 2, to encrypt the private key 16 that is distributed to the electronic key 2. The center 20 distributes the encrypted private key 16 to each of the vehicle 1 and the electronic key 2. In the vehicle 1 and the electronic key 2, the encrypted private key 16 is decrypted by the corresponding on-board device center key 22 and the electronic key center key 23. Then, the center 20 performs cryptographic communication with the vehicle 1 and the electronic key 2 using the decrypted private key 16. In this manner, in the system described in patent document 1, the private key 16 is encrypted with the on-board device center key 22 and the electronic key center key 23 of the vehicle 1 and the electronic key 2, respectively. Thus, even if the private key 16 is acquired in an unauthorized manner during distribution, improper use of the private key 16 when acquired in an unauthorized manner may be limited.

PRIOR ART DOCUMENT

Patent Document

Patent Document 1: Japanese Laid-Open Patent Publication No. 2011-020475

SUMMARY OF THE INVENTION

In the system described in document 1, the on-board device center key 22 and the electronic key center key 23 used to encrypt the private key 16 are used as keys unique to the vehicle 1 and the electronic key 2. The private key 16 distributed from the center 20 is thus always encrypted by a unique key such as the on-board device center key 22 and the electronic key center key 23. Therefore, the encrypted private key 16 can easily be decrypted by deciphering the on-board device center key 22 and the electronic key center key 23.

Furthermore, when periodically updating the on-board device center key 22 and the electronic key center key 23, the center 20, the vehicle 1, and the electronic key 2 need to simultaneously update the possessed key, and the updated keys need to be shared by the center 20, the vehicle 1, and the electronic key 2. Thus, once held by the center 20, the vehicle 1, and the electronic key 2, it becomes difficult to update the on-board device center key 22 and the electronic key center key 23. The security of the cryptographic algorithm decreases when used over a long period. This increases risks.

Such a problem is not limited to data communication between the center, the vehicle, and the electronic key. The same problem occurs with keys used for verification, authentication, and the like of communication data and also in systems that use an authentication code generated by such a key.

Accordingly, it is an object of the present invention to provide an authentication system and an authentication method capable of maintaining high reliability of authentication that uses an authentication code to improve the managing characteristics of communication authentication used for data communication.

The means and effect for achieving the above object will now be described.

To achieve the above object, an authentication system according to the present invention is an authentication system used to authenticate a plurality of nodes. The nodes are connected to a network and transmit and receive communication data. The authentication system includes an adding unit that adds an authentication code to the communication data to verify a transmission source of the communication data. An updating unit updates the authentication code based on a specified authentication code updating protocol whenever communication of the communication data ends.

To achieve the above object, an authentication method according to the present invention is an authentication method used to authenticate a plurality of nodes. The nodes are connected to a network and transmit and receive communication data. The authentication method includes adding an authentication code, which is used to verify a transmission source of the communication data, to the communication data; and updating the authentication code based on a specified authentication code updating protocol whenever communication of the communication data ends.

In the configuration and the method described above, when the communication data is transmitted between the nodes connected to a network, an authentication code, which is used for authentication, is added to the communication data. The authentication code, which is used for authentication, is updated based on an updating protocol specified in advance whenever communication of the communication data ends. Thus, when the communication data is transmitted the next time, the authentication code added to the communication data is updated to a different authentication code. Therefore, even if the authentication code added to the communication data is acquired in an unauthorized manner, the unauthorized authentication code differs from the authentication code added to the communication data that is transmitted next from the node. This restricts unauthorized use of the authentication code that is used to check whether or not the communication data has been tampered with. This allows for the verification of the communication data with the authentication code to be performed with high reliability. Consequently, high reliability is maintained for the verification of the communication data performed with the authentication code.

In one aspect of the present invention, the plurality of nodes share and hold a key code, which is used to generate the authentication code, and a change code, which is used to change the authentication code. The updating protocol sets a protocol for updating the authentication code using the key code and the change code. Further, the updating unit updates the authentication code by performing a predetermined operation with the key code and the change code.

One aspect of the present invention shares and holds a key code, which is used to generate an authentication code, and a change code, which is used to change the authentication code, in the plurality of nodes; and sets a protocol for updating the authentication code with the key code and the change code as the updating protocol. The updating step includes updating the authentication code by performing a predetermined operation with the key code and the change code.

In the configuration and the method described above, a predetermined operation based on two codes, namely, a key code and a change code, is executed to update the authentication code. In other words, whenever the communication of the communication data ends, the predetermined operation is executed with the key code and the change code. Further, the authentication code obtained from the operation result is updated. Thus, as long as the confidentiality of the key code, the change code, and the operation process can be ensured, high confidentiality can be maintained for the authentication code updated with the key code and the change code.

Furthermore, in the configuration and the method described above, even if the authentication code is acquired in an unauthorized manner prior to the updating, the authentication code after the update becomes difficult to assumed from the authentication code because the authentication code is updated based on two codes, namely, the key code and the change code. Thus, high confidentiality can be maintained for the authentication code that is updated from time to time.

In one aspect of the present invention, the updating unit selects a translation code, which includes a predetermined random number that serves as the change code, and executes a recursive operation on the key code using the selected translation code to update the key code from time to time and recursively generate the authentication code with the key code, which is updated from time to time.

In one aspect of the present invention, the updating step includes selecting a translation code including a predetermined random number as the change code, and performing a recursive operation on the key code using the selected translation code to update the key code from time to time and recursively generate the authentication code with the key code, which is updated from time to time.

In the configuration and the method described above, a recursive operation using a translation code including a random number is performed to update the key code for generating the authentication code from time to time. When a predetermined operation using the key code, which is updated from time to time, is executed, the authentication code generated with the key code is also updated from time to time. In other words, in the configuration and the method described above, the authentication code is updated from time to time by updating the key code from time to time. Thus, high confidentiality is maintained for the key code used to generate the authentication code. This maintains the confidentiality of the generation source of the authentication code.

In one aspect of the present invention, the key code includes an initial key, which is held in advance in the plurality of nodes and used when initially generating the authentication code, and an update key, which is generated in an operation performed on the initial key and the translation code from time to time whenever communication of the communication data ends. The updating unit generates an authentication code used when initially communicating the communication data by performing an operation on the initial key and a random code, which includes a predetermined random number held in advance in the plurality of nodes, and updates the generated authentication code using an update key that is generated from time to time.

One aspect of the present invention includes the step of selecting, as the key code, an initial key, which is held in advance in the plurality of nodes and used when initially generating the authentication code, and an update key, which is generated from time to time whenever the communication data is communicated by performing an operation on the initial key and the translation code. The updating step includes a step of generating an authentication code, which is used when initially communicating communication data through an operation performed on the initial key and the random code, and a step of updating the generated authentication code with the update key that is generated from time to time.

According to the configuration or the method described above, an initial key held in advance by an authorized node connected to the network is used as a key code during an initial communication of the communication data. After the completion of the initial communication, an update key generated, from time to time, through the operation of the initial key and the translation code is used for the key code.

At the time of the initial communication between the nodes, an authentication code is first generated based on the random code and the initial key held in advance by the authorized node. At the time of the subsequent communications, the operation based on the update key generated, from time to time, and the random code, for example, is executed to update the authentication code.

In the configuration and the method described above, the authentication code is generated using the initial key, which is held only in an authorized node, and the random code. Further, once the authentication code is generated, the authentication code is updated from time to time. Thus, as long as the confidentiality of the initial key and the random code can be ensured, high confidentiality can be maintained for the authentication code, which is generated with the initial key and the random code and transmitted to the network.

In the configuration and the method described above, the authentication code is generated and updated based on a plurality of different codes such as the initial key, the translation code, and the random code. Thus, the generation source and the update source of the authentication code become further difficult to specify. This restricts unauthorized use of the authentication code transmitted in the network together with the communication data.

In one aspect of the present invention, the authentication system further includes an authenticating unit that authenticates a node that becomes a communication peer when transmitting and receiving the communication data. When authenticating the node that becomes a communication peer, the authenticating unit acquires, from the communication peer, communication data to which a message code is added. The message code is generated by performing an operation on a random code, which includes a predetermined random number held in advance in the plurality of nodes, and the key code. The authenticating unit verifies the communication data, to which the message code is added, by comparing a random code, which is restored by performing an operation on the acquired message code and the key code held by the authenticating unit, with a random code, which is held in advance by a node that receives the communication data from the communication subject. The updating unit updates the message code as the authentication code.

In one aspect of the present invention, the authentication method further includes the step of acquiring, when authenticating a node that becomes a communication subject, from the communication subject communication data to which a message code is added. The message code is generated by performing an operation on a random code, which includes a predetermined random number held in advance in the plurality of nodes, and the key code, verifying the communication data to which the message code is added by comparing a random code, which is restored by performing an operation on the acquired message code and the key code that is held in advance, with a random code, which is held in advance by a node that receives the communication data from the communication subject, and authenticating a node that becomes the communication subject when transmitting and receiving the communication data based on the verification result. The updating step includes updating the message code as the authentication code.

In the configuration and the method described above, when the communication data is transmitted, the random code shared and held by a plurality of authorized nodes is converted to the message code by the key code. The converted message code is then added to the communication data. At the node receiving the communication data, the message code is restored to the random code through the operation using the key code held in the node. As a result, if the restored random code matches with the random code held in advance by the node receiving the communication data, it is determined that the communication data and the message code have not been tampered with. When determined in the verification that the communication data and the message code have not been tampered with, the communication data and the message code are authenticated as codes that have been appropriately transmitted from the authorized node. The communication data that has been determined as being appropriately transmitted from the authorized node is used at the node receiving the communication data.

If the restored random code differs from the random code held in advance by the node receiving the communication data, it is determined that the communication data and the message code have been tampered with and that the transmission source of the communication data and the message code is an unauthorized node. The communication data of which the transmission source has been determined as being unauthorized is discarded as being unauthorized communication data. In the same manner, the communication data that has been determined as having been tampered with is also discarded as being unauthorized communication data.

In the configuration and the method described above, the message code added during the transmission of the communication data and used when verifying the communication data and the transmission source is updated as the authentication code. Thus, even if the message code used in the verification of the communication data and the transmission source of the communication data is acquired in an unauthorized manner, a different messages code is used for the verification of the communication data in the transmission of the next communication data. This reduces risk when using the message code to verify the communication data and the transmission source of the communication data.

In one aspect of the present invention, before authenticating a node that becomes a communication peer, the authenticating unit restores a message code, which is generated by performing an operation on the key code and the random code, to a random code using the key code, which is held in advance in the authenticating unit, to acquire a random code used to verify the communication data.

In the configuration described above, the random code used to verify the communication data and the transmission source of the communication data is distributed to each node in a state converted to the message code by the key code. In each node, the distributed message code is restored from the message code to the random code by the key code that is held in advance. Even if an unauthorized node, which is connected to the network, acquires the message code in an unauthorized manner, the unauthorized node cannot restore the illegally acquired message code to the random code since the unauthorized node does not hold the key code. In other words, the unauthorized node cannot acquire the random code in an unauthorized manner. This restricts unauthorized use of the random code, which is used to verify the communication data and the transmission source of the communication data. Therefore, the random code distributed prior to the communication of the communication data is held by the authorized node with high confidentiality.

Further, in the configuration described above, if the authorized node connected to the network holds at least the key code, the authorized node can hold the random code later. In other words, the authorized node only needs to hold at least the key code prior to the verification of the communication data and the transmission source of the communication data and the acquisition of the random code. This allows for a high degree of freedom when verifying the random code, the communication data that uses the random code, and the transmission source.

In one aspect of the present invention, a node that transmits the communication data distributes the change code to a node that is a transmission peer together with an authentication code, which is added to the communication data. Further, the updating unit updates a key code using the change code as long as a transmission process of communication data, to which the authentication code and the change code are added, is completed.

In the configuration described above, the communication data, the authentication code for verification of the communication data and the transmission source of the communication data, and the change code for updating the key code are distributed to the receiving node to which the communication data is transmitted. After the transmission process of the communication data is completed, the updating unit updates the key code using the change code distributed to the receiving node with the communication data. The authentication code is updated using the updated key code, and the updated authentication code is used in the transmission of the next communication data.

Thus, the node, to which the communication data is transmitted, can acquire the change code for updating the authentication code transmitted with the communication data whenever the data communication is performed. The authentication code is updated using the change code, and the updated authentication code is added to the communication data that is transmitted next and then transmitted. The completion of the transmission process of the communication data and the updating of the authentication code are thus smoothly performed.

In one aspect of the present invention, the plurality of nodes share and hold a key code, which is used to generate an authentication code, and a change code, which is used to change the authentication code. The updating protocol sets a protocol for updating the authentication code with the key code and the change code. Further, the updating unit updates the authentication code by changing the type of operation for the authentication code using the change code whenever communication of the communication data ends.

In the configuration described above, an operation based on two codes, the key code and the change code, is executed to generate the authentication code. In the configuration described above, the operation type based on the key code and the change code is changed whenever the communication of the communication data ends. This updates the authentication code obtained from the operation result. Thus, as long as the confidentiality of the key code, the change code, and the type of operation type can be ensured, high confidentiality can be maintained for the authentication code updated with the key code and the change code.

In the configuration and the method described above, the authentication code is updated based on two codes, namely, the key code and the change code, so that even if the authentication code before the update is acquired in an unauthorized manner, the updated authentication code becomes difficult to assume from the authentication code. This maintains high confidentiality for the authentication code, which is updated from time to time.

In one aspect of the present invention, the plurality of nodes share and hold a key code, which is used to generate an authentication code, and a change code, which is used to change the authentication code. The updating protocol sets a protocol for updating the authentication code with the key code and the change code. The updating unit counts the number of communications of the communication data transmitted between the plurality of nodes and generates the authentication code using a number of key codes corresponding to the number of counted communications to update the authentication code.

In the configuration described above, an operation based on two codes, namely, the key code and the change code, is executed to generate the authentication code. In the configuration described above, key codes, the number of which corresponds to the number of communications of the communication data, are used to generate the authentication code. In other words, the generated authentication code is changed to a different code in accordance with the number of communications of the communication data. Thus, as long as the confidentiality of the key code, the change code, and the number of encryptions can be ensured, high confidentiality can be maintained for the authentication code updated with the key code and the change code.

In the configuration described above, the authentication code is updated with based on two codes, the key code and the change code, so that even if the authentication code before the update is illegally acquired, the authentication code of after the update becomes difficult to presume from the authentication code. Thus, high confidentiality can be maintained for the authentication code, which is updated from time to time.

In one aspect of the present invention, the plurality of nodes includes a plurality of on-board controllers arranged in a vehicle to configure a vehicle network. The adding unit and the updating unit are each arranged in each of the plurality of on-board controllers. The updating units arranged in the plurality of on-board controllers synchronously update the authentication code whenever communication data is transmitted and received through the vehicle network.

In a vehicle network installed in a vehicle such as an automobile, for example, the vehicle speed data indicating the travelling speed of the vehicle and the control data of various types of control systems are processed by on-board controllers. Since the communication data processed by such-board controllers is used to control the vehicle, there is a particularly high necessity for verifying the communication data. Many on-board controllers are arranged in the vehicle. This imposes a limitation on the arithmetic processing capacity of the on-board controllers, and it is difficult for the on-board controller to perform sophisticated authentication processes.

In this regard, a plurality of on-board controllers of the vehicle network is selected as a plurality of nodes in the configuration described above. The authentication code, which is updated from time to time, is added to the communication data transmitted and received between the on-board controllers. Thus, even if the authentication code generated in the on-board controller or the like is not that complicated, high confidentiality can be maintained high since such the authentication code is updated from time to time. Therefore, even in the on-board controller has a limited arithmetic processing capacity, the verification of the communication data and the transmission source of the communication data using the authentication code can be performed with high reliability. This maintains high reliability for the vehicle network that requires a high level of security.

DETAILED DESCRIPTION OF THE PREFERRED EMBODIMENTS

First Embodiment

A first embodiment of an authentication system and an authentication method according to the present invention will now be described with reference to FIGS. 1 to 6. The authentication system and the authentication method according to the present embodiment manage the communication performed through a vehicle network of a vehicle. In the present embodiment, the updating protocol sets the protocol for updating a message code using a key code, which includes an initial key and an update key, and a change code, which includes a random code and a translation code that are both formed by predetermined random numbers.

Figure 1:
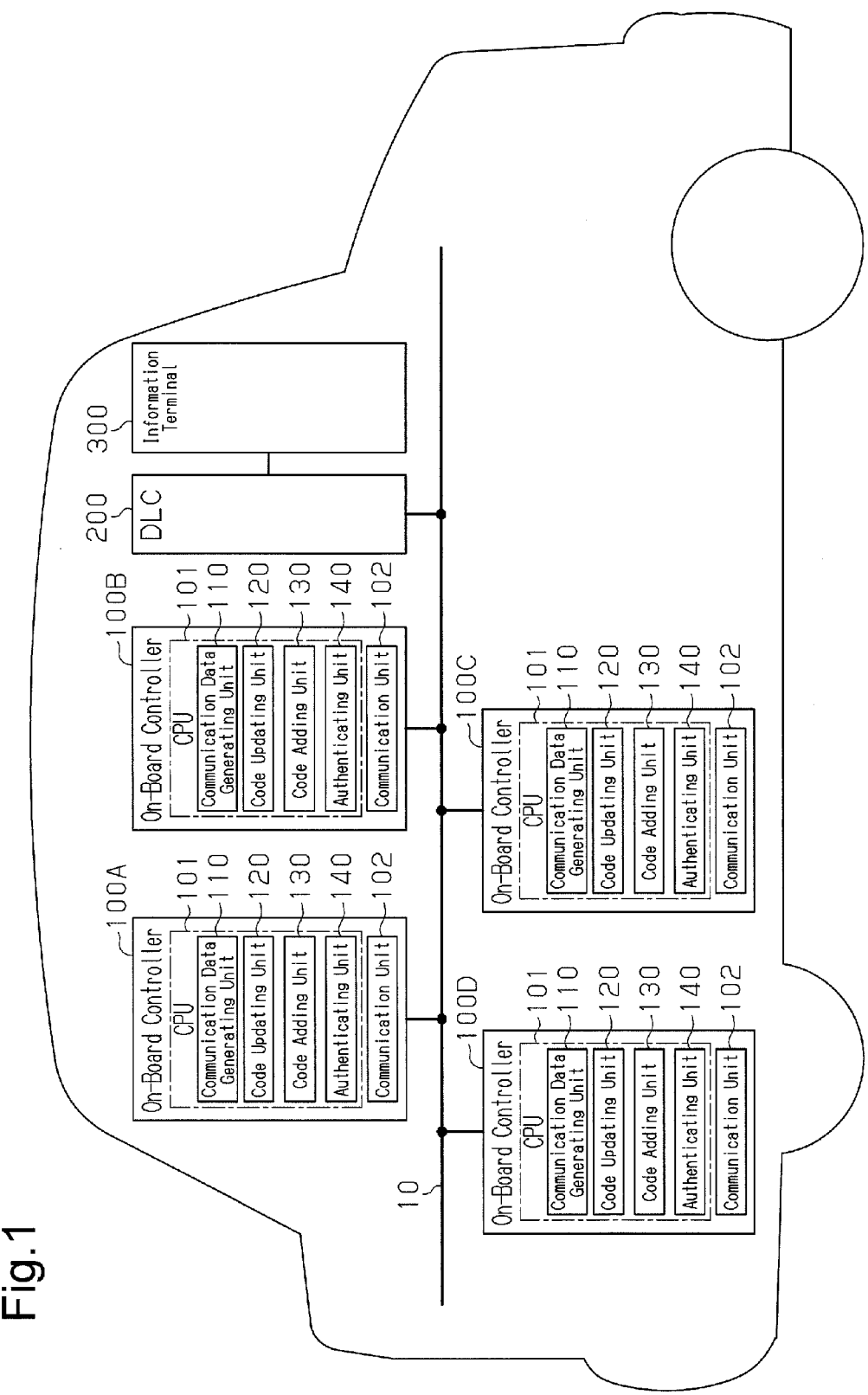
FIG. 1 is a schematic block diagram showing the configuration of a vehicle network to which an authentication system and an authentication method is applied in a first embodiment of an authentication system and an authentication method according to the present invention.

As shown in FIG. 1, the vehicle includes on-board controllers 100A to 100D, which are a plurality of nodes that electronically control various types of on-board devices installed in the vehicle. The on-board controllers 100A to 100D control devices for information system such as a navigation system, devices for various types of vehicle drive systems such as the engine, the brake, and the steering wheel, and devices for body systems such as meters that show various conditions the air conditioner and the vehicle.

Such on-board controllers 100A to 100D are, for example, connected to a communication line 10, which configures the vehicle network. Each of the on-board controllers 100A to 100D transmits and receives communication data such as data indicating detection results of various sensors detecting vehicle conditions, control data for various on-board devices, and the like through the communication line 10. In the present embodiment, for example, a control area network (CAN) is used as the communication protocol of the vehicle network. The on-board controllers 100A to 100D transmit and receive the communication data in accordance with the communication protocol specified by CAN.

In the present embodiment, for example, the on-board controller 100A is specified as the on-board controller that represents each of the on-board controllers 100A to 100D.

In the vehicle, for example, a Data Link Connector (DLC) 200 is arranged in the passenger compartment and connected to a device such as a diagnosis device. The DLC 200 is connected to the communication line 10 so that devices connected to the DLC 200 and devices connected to the vehicle network, such as the on-board controllers 100A to 100D, can communicate with each other. Other diagnosis devices, for example, an information terminal 300 such as a smartphone, and the like are also connected to the DLC 200 of the present embodiment. Such a diagnosis device and the information terminal 300 acquire communication data transmitted by the on-board controller 100A to 100D when connected to a vehicle network through the DLC 200. The diagnosis device and the information terminal 300 transmit various types of data to the vehicle network.

Each of the on-board controllers 100A to 100D includes a central processing unit 101 for performing various types of operations such as an operation for generating control data for various types of on-board devices and the like. The on-board controllers 100A to 100D each include a communication unit 102 configured by a CAN controller and the like that manages the transmission and reception of the communication data.

Each central processing unit 101 includes a communication data generating unit 110 that generates communication data. Each central processing unit 101 of the present embodiment includes an updating unit 120 that generates and updates an authentication code and the like to verify the communication data generated by the communication data generating unit 110 and the transmission source of the communication data. In the same manner, each central processing unit 101 of the present embodiment includes an adding unit 130 that adds a code, which is generated or updated by the updating unit 120, to the communication data generated by the communication data generating unit 110. Furthermore, each central processing unit 101 of the present embodiment includes an authenticating unit 140 that authenticates the communication data transmitted through the vehicle network and the transmission source of the communication data.

Figure 2:
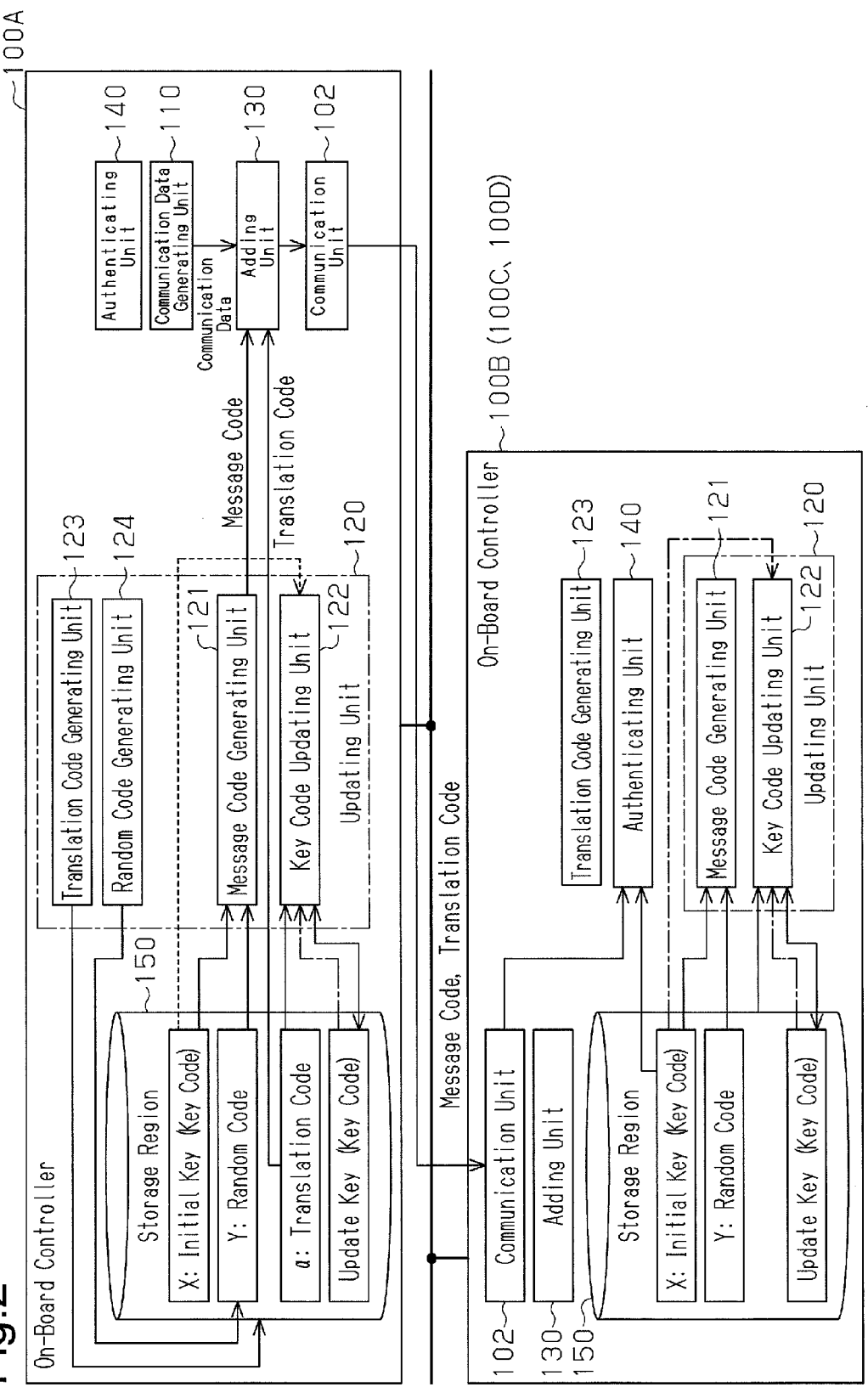
FIG. 2 is a schematic block diagram showing the configuration of an on-board controller including an updating unit and an adding unit.

FIG. 2 shows the configuration of the on-board controllers 100A to 100D in detail. The updating unit 120 of the present embodiment includes a message code generating unit 121 that generates a message code, which is an authentication code for verifying the communication data and the transmission source of the communication data. The updating unit 120 of the present embodiment also includes a key code updating unit 122 for generating a key code that generates the authentication code.

The message code generating unit 121 acquires an initial key saved in a storage region 150, as shown by the broken line arrow in FIG. 2, during an initial communication in which communication is performed for the first time in the vehicle network after an ignition key of the vehicle is turned ON. In the same manner, during the initial communication, the message code generating unit 121 acquires a random code including a predetermined random number saved in the storage region 150. The message code generating unit 121, for example, performs an OR operation with the acquired initial key and the random code to generate the message code. This converts the random code to the message code in the present embodiment.

When a second or subsequent communication is performed after the ignition key of the vehicle is turned ON, the updating unit 120 acquires an update key, which is the updated initial key, from the storage region 150 in place of the initial key, as shown by the dashed line arrow in FIG. 2. The message code generating unit 121, for example, performs an OR operation on the acquired update key and the random code to generate the message code. Thus, in the present embodiment, the message code is generated based on the update key that has been updated. Thus, the update key and the message code are updated from time to time.

The initial key saved in the storage region 150 is, for example, distributed in advance when the vehicle is shipped from the factory to the authorized on-board controllers 100A to 100D connected to the vehicle network. The random code saved in the storage region 150 is distributed in advance from the authorized on-board controller 100A connected to the vehicle network to the authorized on-board controllers 100B to 100D and the like. Furthermore, a translation code including a predetermined random number generated by a translation code generating unit 123, for example, is saved in the storage region 150.

The key code updating unit 122 updates the key code for generating the message code whenever the communication of the communication data through the vehicle network is completed. The key code updating unit 122, for example, performs an OR operation on the translation code and the initial key saved in the storage region 150 to update the initial key that becomes an initial key code. The initial key is then converted to the update key. In the second and subsequent communications, the update key and the translation code that are being used undergo an OR operation, for example, to update the update key from time to time.

In the present embodiment, an operation based on the key code, which includes the initial key or the update key for generating the authentication code, and the translation code is recursively executed. Such operation is performed synchronously in each of the on-board controllers 100A to 100D whenever the on-board controllers 100A to 100D complete the transmission process of the communication data in the vehicle network. Thus, the key code held by each of the on-board controllers 100A to 100D is updated from time to time whenever the vehicle network completes the transmission process of the communication data.

The translation code generating unit 123 generates the translation code including a predetermined random number prior to the transmission process of the communication data. The translation code generating unit 123 saves the generated translation code in the storage region 150 of the on-board controller 100A. The translation code generating unit 123 generates the translation code when the on-board controller of the translation code generating unit 123 becomes the transmission subject of the communication data. The translation code generated by the translation code generating unit 123 is distributed together with the communication data, for example. The distributed translation code is, for example, saved in the storage region 150 arranged in each of the on-board controllers 100A to 100D and used to update the key code.

Furthermore, a random code generating unit 124 arranged in the representative on-board controller 100A generates the random code including a predetermined random number prior to the transmission process of the communication data. The random code generating unit 124 saves the generated random code in the storage region 150 of the on-board controller 100A. The random code generating unit 124 of the present embodiment, for example, generates the random code as long as the ignition key of the vehicle is switched from OFF to ON. The random code generating unit 124 distributes the generated random code to the on-board controllers 100B to 100D after the ignition key is turned ON. The random code distributed to each of the on-board controllers 100B to 100D is, for example, saved in the storage region 150 arranged in each of the on-board controllers 100B to 100D.

When, for example, the communication unit 102 transmits the communication data, the adding unit 130 adds a random code converted based on the key code (initial key, update key), namely, the message code, to the communication data. Further, the adding unit 130 adds the translation code for updating the key code (initial key, update key) to the communication data.

The communication unit 102 of each of the on-board controllers 100A to 100D transmits the communication data, to which the message code and the translation code are added, to the vehicle network.

The communication unit 102 of the representative on-board controller 100A distributes the random code generated by the random code generating unit 124 to each of the other on-board controllers 100B to 100D, which become the communication peer, prior to the transmission of the communication data. The communication unit 102 of the present embodiment distributes the message code converted based on the random code and the key code by the message code generating unit 121 to each of the on-board controllers 100B to 100D to maintain the confidentiality of the random code.

The authenticating unit 140 of each of the on-board controllers 100B to 100D executes the OR operation on the initial key or the update key, which is saved in the storage region 150, and the message code, which is distributed to the on-board controller 100B to 100D. Thus, the message code, which is distributed when the ignition key of the vehicle is turned ON, is restored to the random code. The restored random code is saved in the storage region 150 of each of the on-board controllers 100B to 100D.

When receiving the communication data, to which the message code and the translation code are added, from the communication unit 102, the authenticating unit 140 of the on-board controller 100B to 100D verifies the communication data and the transmission source of the communication data.

The authenticating unit 140 verifies the communication data and the transmission source of the communication data using the random code distributed in advance from the on-board controller 100A prior to the exchange of the communication data. In other words, when acquiring the message code transmitted together with the communication data, the authenticating unit 140 performs an OR operation on the message code and the initial key or the update key saved in the storage region 150. The authenticating unit 140 restores the message code to the random code by performing such an operation. The authenticating unit 140 compares the restored random code and the random code distributed in advance from the representative on-board controller 100A.

If the compared random codes match, the authenticating unit 140 verifies that the communication data transmitted together with the message code has not been tampered with and that the communication data and the message code have been transmitted by one of the authorized on-board controllers 100A to 100D. The on-board controllers 100A to 100D receiving the communication data, to which the message code is added, execute various types of controls based on the communication data, which has been verified.

If the compared random codes are different, the authenticating unit 140 determines that the message code or the communication data has been tampered with in an unauthorized manner by the information terminal 300 or the like that is connected to the vehicle network, for example. Furthermore, if the compared random codes are different, the authenticating unit 140 determines that the received communication data has been transmitted in an unauthorized manner by the information terminal 300 that is connected in an unauthorized manner to the vehicle network, for example. The authenticating unit 140 discards the communication data that has been determined as having been tampered with or the communication data that has been determined as having been transmitted in an unauthorized manner. After discarding the communication data, the authenticating unit 140 issues a transmission request for authorized communication data to the authorized on-board controllers 100A to 100D and the like, for example.

The updating of the key code and the authentication code performed by the authentication system and the authentication method in the present embodiment will now be described in detail with reference to FIG. 3.

Figures 3A, 3B, 3C, 3D:
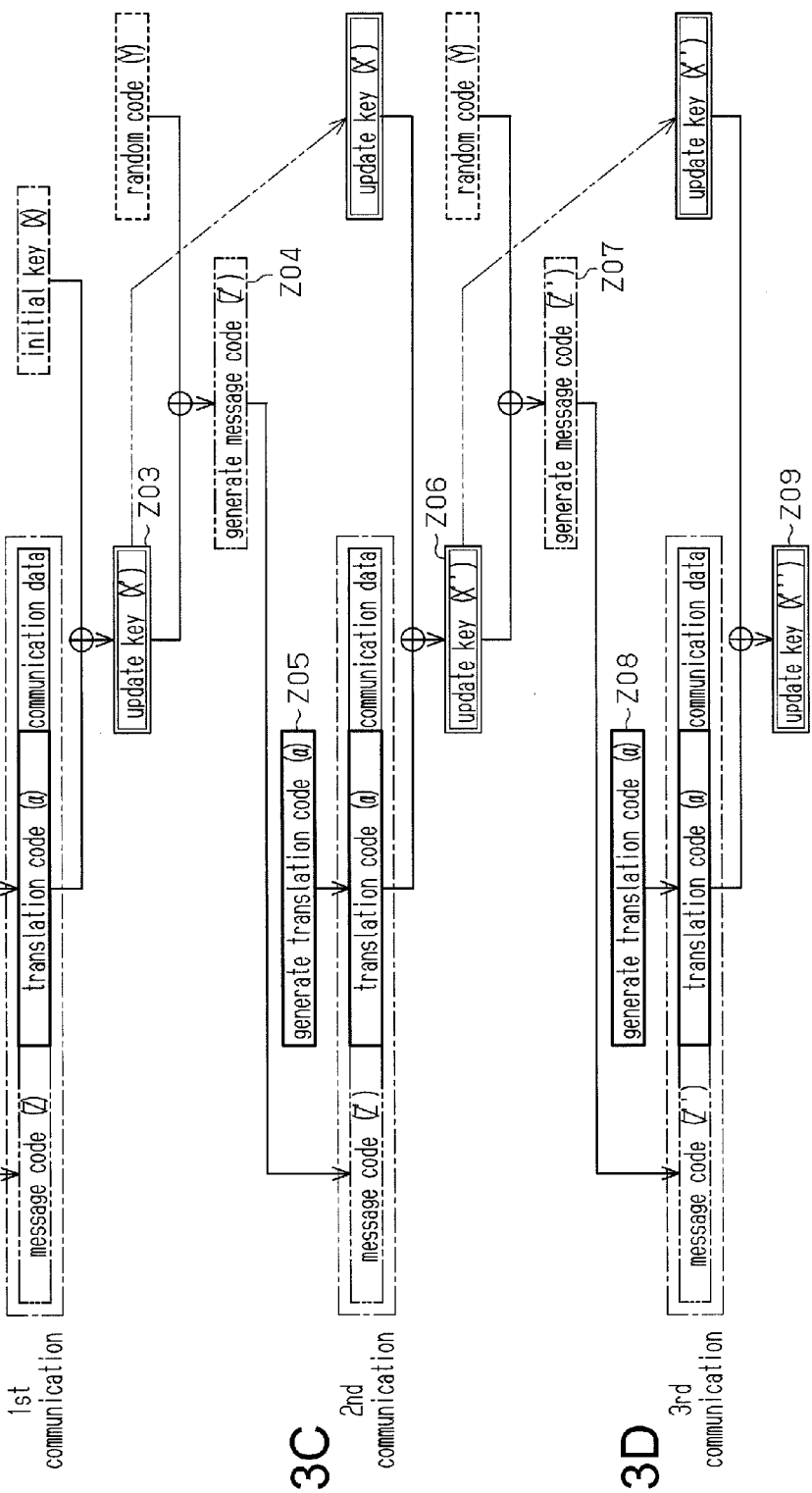
FIGS. 3A to 3D are diagrams showing one example of a mode for updating a key code and a message code with the updating unit.

First, as shown in FIG. 3A, when the ignition key of the vehicle is turned ON, the random code generating unit 124 of the representative on-board controller 100A generates a random code Y. The generated random code and an initial key X, which is the initial key code, held by the on-board controller 100A undergo, for example, an OR operation. This converts the random code to a message code Z based on the initial key (block Z01). The generated message code is then distributed from the on-board controller 100A to each of the on-board controllers 100B to 100D or the like.

In this example, a predetermined number of bits are assigned to the initial key, the random code, the message code, the translation code, and the update key. The number of bit may be set, for example, as a half value of a value obtained by subtracting the number of bits used for control from 64 bits of communication data that is based on the CAN communication protocol.

During the data communication performed between the on-board controllers 100A to 100D, the translation code generating unit 123 of the on-board controller, which becomes the communication subject of the communication data, executes a predetermined operation. This generates a translation code a that is formed by a random number (block Z02).

As shown in FIG. 3B, the communication data, to which the generated message code and the translation code are added, is transmitted to the vehicle network. After the transmission process of the communication data is completed, the translation code transmitted together with the communication data and the initial key, which is held in advance by each of the on-board controllers 100A to 100D, undergo, for example, an OR operation in each of the on-board controllers 100A to 100D. This updates the key code is from the initial key X to an update key X' (block Z03). The updated update key and the random code undergo, for example, an OR operation to generate a message code Z' (block Z04). This updates the authentication code from the initial message code Z to a new message code Z'. Furthermore, for example, each translation code generating unit 123 of the on-board controllers 100A to 100D generates a new translation code a' (block Z05).

As shown in FIG. 3C, when a second data communication is performed after the ignition key of the vehicle is turned ON, the updated message code and the translation code are added to the communication data. The communication data, to which the message code and the translation code are added, is transmitted to the vehicle network.

After the transmission process of the second communication data is completed, the translation code transmitted together with the communication data and the initial key, which is held in advance by each of the on-board controllers 100A to 100D, again undergo an OR operation in each of the on-board controllers 100A to 100D. This updates the key code from the already used update key X' to a new update key X'' (block Z06). The update key, which has been updated, and the random key undergo, for example, an OR operation to generate a message code Z'' (block Z07). This further updates the authentication code from the already used message code Z' to the new message code Z''. For example, the translation code generating unit 123 of each of the on-board controllers 100A to 100D generates a new translation code (block Z08).

As shown in FIG. 3D, when a third data communication is performed after the ignition key of the vehicle is turned ON, the updated message code and the translation code are added to the communication data, which is transmitted to the vehicle network. Subsequently, in the same manner, the already used key code is updated from the already used update key X'' to a new update key X''' (block Z09). The updated update key and the random code undergo, for example, an OR operation to generate a new message code.

Therefore, in the present embodiment, the initial key and the update key, which are the key codes used to generate the message code, are updated from time to time whenever each on-board controller 100A to 100D transmits the communication data. An operation based on the updated initial key, the update key, and the translation code, which is calculated from time to time, is recursively executed so that the message code, which is added to the communication data to perform verification, is updated from time to time. Thus, the message code transmitted to the vehicle network changes whenever the communication data is transmitted. Therefore, even if the message code transmitted together with the communication data to the vehicle network is acquired in an unauthorized manner by, for example, the information terminal 300 or the like that is connected to the vehicle network, the message code is invalid in the next communication. This limits impersonation and the like when the message code is used in an unauthorized manner and maintains the security of the vehicle network.

The operation of the authentication system and the authentication method in the present embodiment will now be described with reference to FIG. 4.

Figure 4:
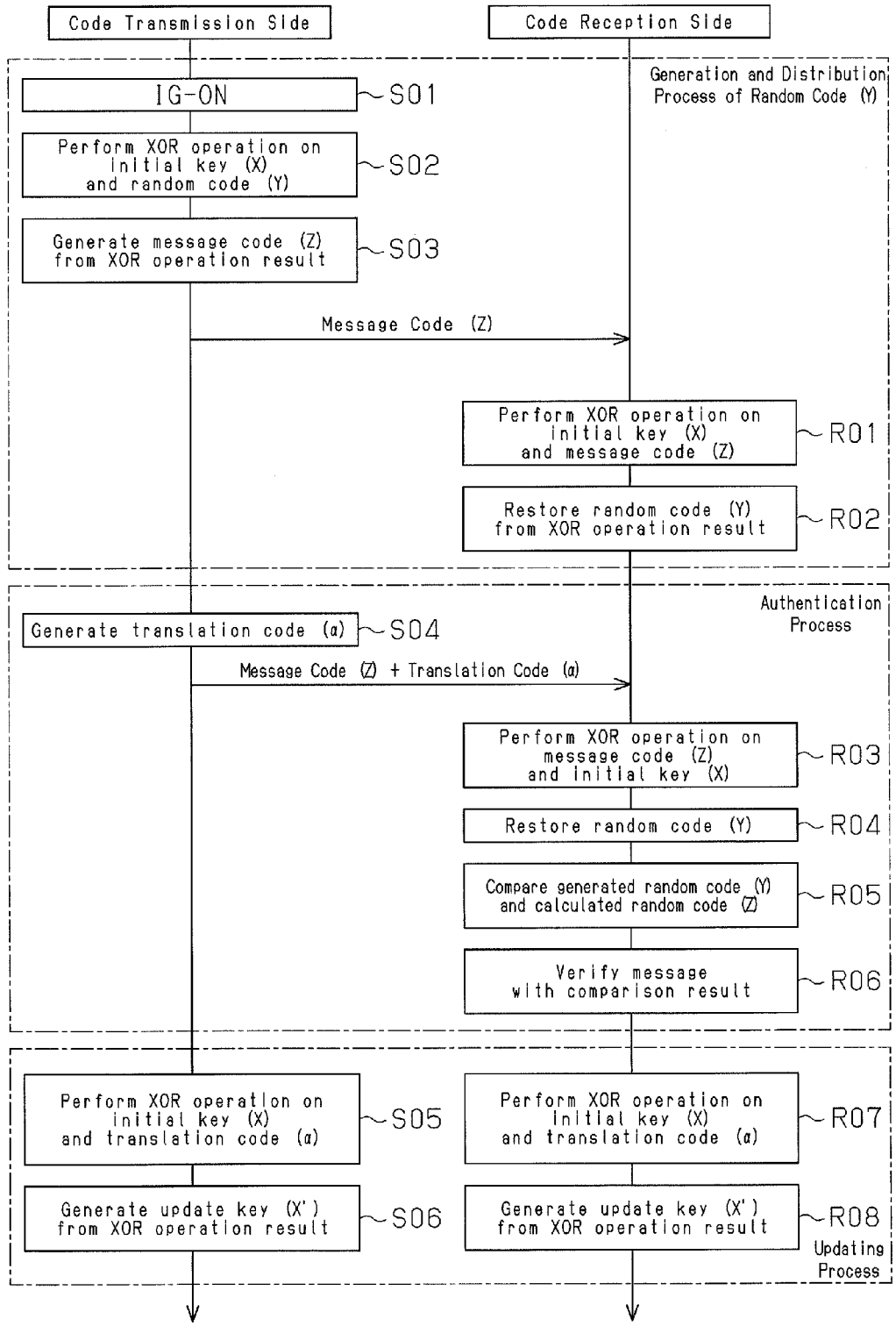
FIG. 4 is a sequence chart showing one example of the procedures for updating the key code and the message code with the updating unit and the procedures for performing authentication with an authenticating unit.

As shown in FIG. 4, for example, when the ignition key of the vehicle is switched from OFF to ON (S01), the representative on-board controller 100A executes the distribution process of the random code. In the distribution process, the initial key held by the on-board controller 100A and the random code generated by the random code generating unit 124, for example, first undergo an OR operation (S02). A message code is generated from the operation result (S03). The generated message code is distributed from the on-board controller 100A to the on-board controllers 100B to 100D and the like, which are connected to the vehicle network.

When receiving the message code, each of the on-board controllers 100B to 100D, for example, performs an OR operation on the message code and the initial key held in advance by the corresponding on-board controller 100B to 100D (R01). The message code is restored to the random code through such an operation (R02).

Then, an authentication process is performed based on the restored random code. In the authentication process, for example, the translation code is generated in the on-board controller 100A, which is the transmission subject of the communication data (S04). The translation code and the message code are added to the communication data that is transmitted (adding step), and the communication data is transmitted to the vehicle network.

When receiving the communication data to which the translation code and the message code are added, each of the on-board controllers 100B to 100D, for example, performs an OR operation on the received message code and the initial key held in advance by the corresponding on-board controller 100B to 100D (R03). Such an operation restores the message code to the random code (R04).

Each of the on-board controllers 100B to 100D compares the restored random code distributed in advance from the on-board controller 100A with the restored random code distributed together with the communication data (R05). Each of the on-board controllers 100B to 100D verifies the communication data and the on-board controller 100A, which is the transmission source of the communication data, based on whether or not the compared random codes match (R06).

If the compared random codes match, each of the on-board controllers 100B to 100D determines that the communication data has been transmitted from the authorized on-board controller 100A and that the communication data has not been tampered. Each of the on-board controllers 100B to 100D then executes various types of controls based on the communication data. If the compared random codes are different, each of the on-board controllers 100B to 100D determines that the received communication data has been transmitted to the vehicle network by an unauthorized device and discards the communication data. Alternatively, if the compared random codes are different, each of the on-board controllers 100B to 100D determines that the communication data transmitted from the on-board controller 100A has been tampered with in an unauthorized manner and discards the communication data.

In this manner, after the ignition key is turned ON and the transmission process of the first communication data is completed, the updating process is executed on the key code for generating the message code (updating step). In the updating process, for example, the translation code, which is generated and transmitted by the on-board controller 100A, and the initial key, which is held by each of the on-board controllers 100A to 100D, undergo, for example, an OR operation in each of the on-board controllers 100A to 100D (S05, R07). The OR operation updates the initial key, which is used to generate the message code, to the update key (S06, R08).

The procedures for authenticating the communication data with the authentication system and the authentication method in the present embodiment will now be described with reference to FIGS. 5 and 6.

Figure 5:
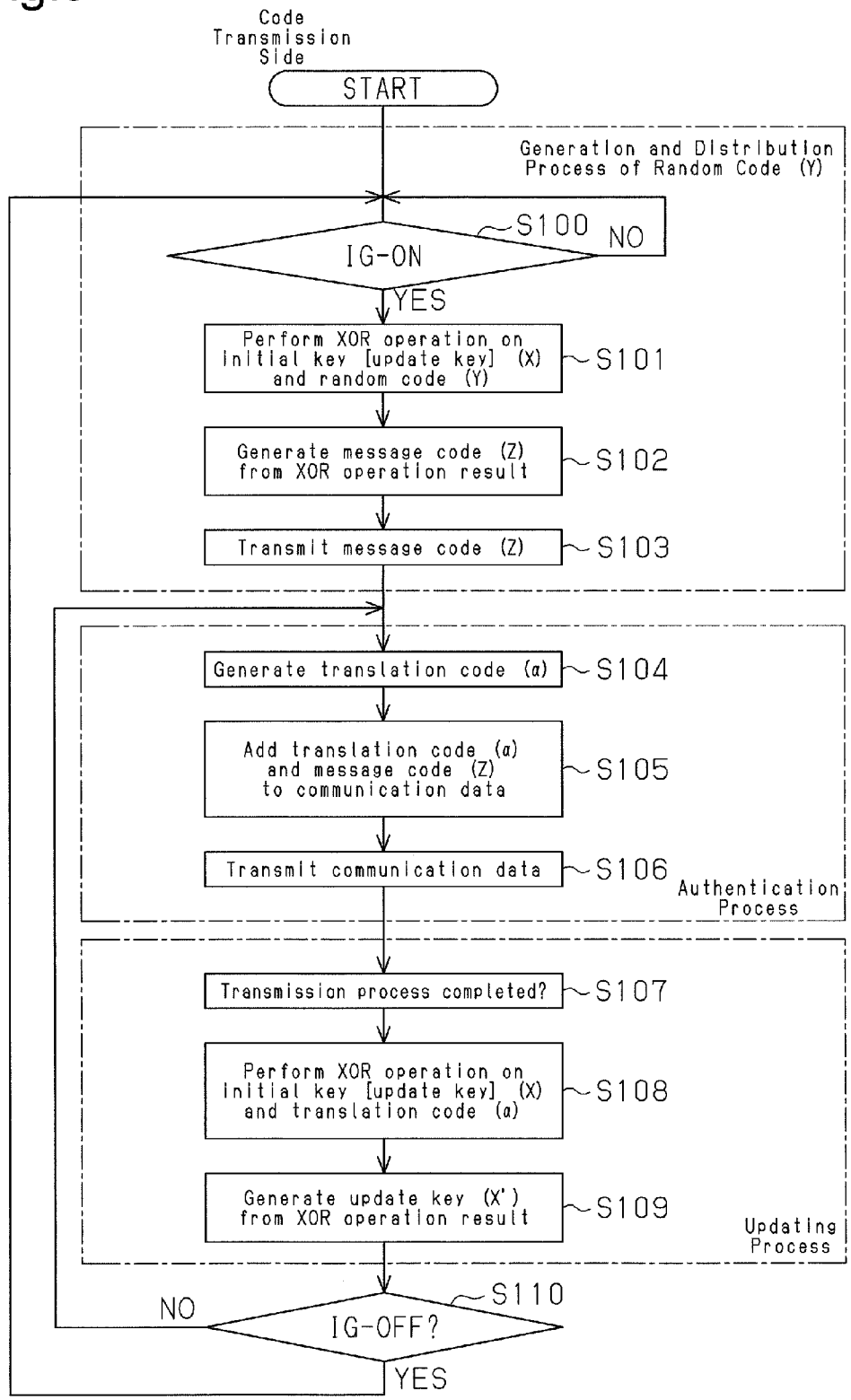
FIG. 5 is a flowchart showing one example of the procedures for transmitting communication data with a transmission subject of the communication data and the procedures for updating the key code and the message code.

As shown in FIG. 5, for example, when the ignition key is switched from OFF to ON (step S100: YES), the representative on-board controller 100A generates the message code and transmits the generated message code to, for example, each of the on-board controllers 100B to 100D (steps S101 to S103).

Then, the on-board controller 100A, which is the transmission subject of the communication data, adds the translation code and the message code to the communication data (steps S104, S105: adding step). The communication data is then transmitted to each of the on-board controllers 100B to 100D, for example (step S105).

When the transmission of the communication data is completed, the on-board controller 100A updates the key code and the message code until the ignition key is turned OFF (steps S107 to S5110: updating step). Thus, the key code and the message code added to the communication data are updated whenever the transmission process of the communication data is completed.

Figure 6:
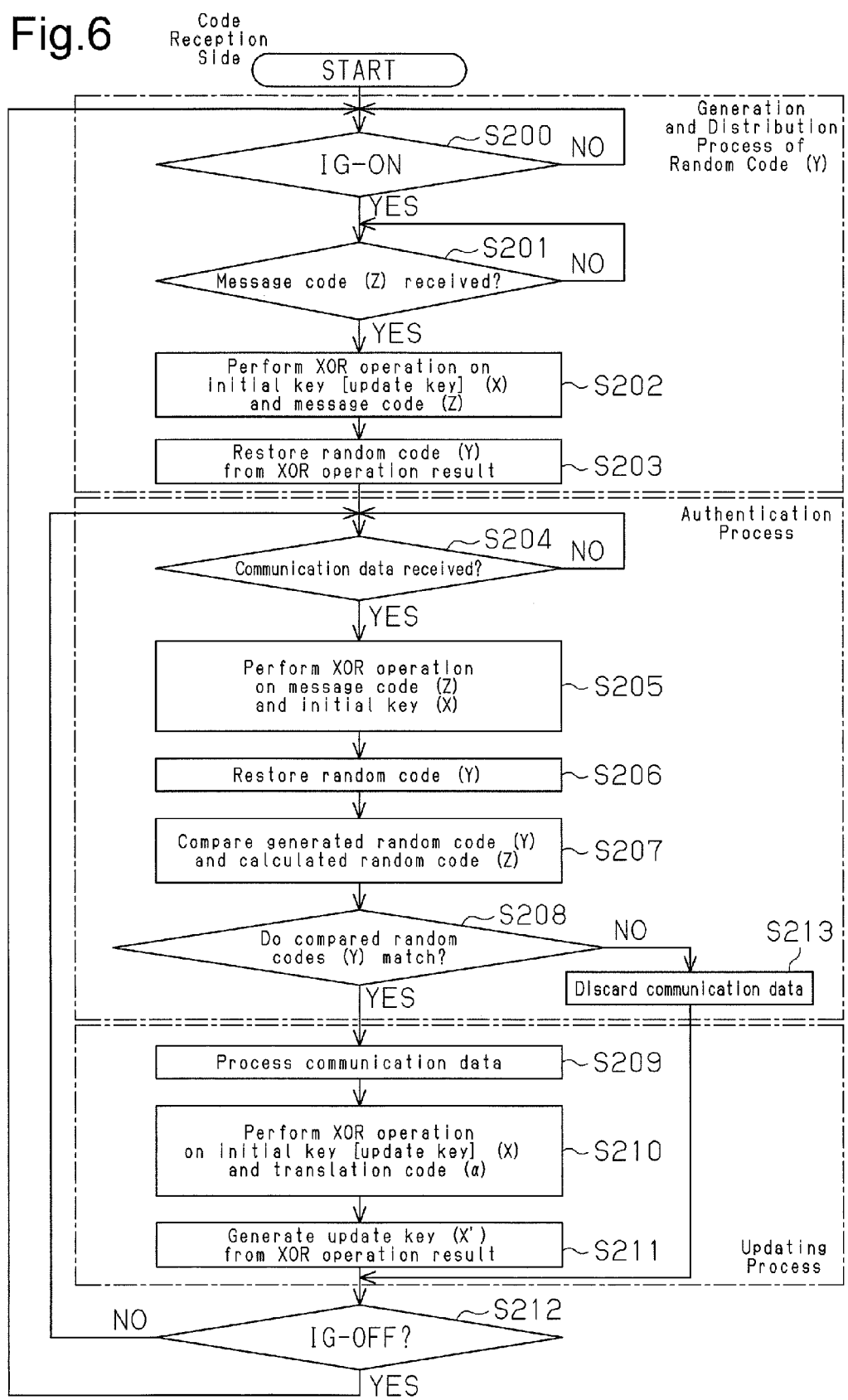
FIG. 6 is a flowchart showing one example of the procedures for authenticating the communication data with a reception subject of the communication data and the procedures for updating the key code and the message code.

As shown in FIG. 6, for example, each of the on-board controllers 100B to 100D that becomes the reception subject of the communication data acquires the message code transmitted from the on-board controller 100A after the ignition key is switched from OFF to ON (step S200: YES, S201: YES).

During an initial communication after the ignition key is turned ON, each of the on-board controllers 100B to 100D restores the acquired message code to the random code based on the initial key held by each of the on-board controllers 100B to 100D (steps S202, S203). During second and subsequent communications after the ignition key is turned ON, each of the on-board controllers 100B to 100D restores the acquired message code to the random code based on the update key, which has been updated and which is held by the corresponding on-board controller 100B to 100D.

When receiving the communication data transmitted by the on-board controller 100A, for example (step S204: YES), each of the on-board controllers 100B to 100D verifies the received communication data (steps S205 to S207).

As a result, if the communication data is verified, each of the on-board controllers 100B to 100D executes a process that is based on the communication data (steps S208: YES, S209). If the communication data cannot be verified, each of the on-board controllers 100B to 100D discards the communication data (steps S208: N0, S213).

Each of the on-board controllers 100B to 100D processes the communication data and then updates the key code (initial key, update key) and the message code until the ignition key is turned OFF (steps S209 to S212). This processes the communication data, and the key code and the message code added to the communication data are updated whenever the transmission process of the communication data is completed.

As described above, the authentication system and the authentication method in the present embodiment have the following advantages.

(1) The adding unit 130, which is arranged in each of the on-board controllers 100A to 100D, adds the authentication code, which is used to verify the transmission source of communication data, to the communication data. The updating unit 120, which is arranged in each of the on-board controllers 100A to 100D, updates the authentication code based on the specified authentication code updating protocol whenever the communication of the communication data is completed. This allows for highly reliable verification to be performed on the communication data with the authentication code. Consequently, high reliability is maintained for the authentication using the authentication code. Furthermore, in the embodiment described above, the message code that is transmitted to the vehicle network together with the communication data is not used in the next communication. Thus, even if the message code is acquired in an unauthorized manner, unauthorized use of the message code is limited. Therefore, the message code added to the communication data does not need to be encrypted, and the processing load is reduced when transmitting and receiving the communication data.

(2) The updating protocol sets the protocol for updating the message code using the key code, which includes the initial key and the update key, and the change code, which includes the random code and the translation code. The updating unit 120 updates the authentication code including the message code through the operation based on the key code and the change code. Thus, as long as the confidentiality of the key code, the change code, and the operation process can be ensured, high confidentiality can be maintained for the message code that is updated based on the key code and the change code.

(3) The updating unit 120 executes a recursive operation on the key code (initial key, update key) using the translation code selected as the change code to update the key code from time to time. The updating unit 120 recursively generates the message code using the key code updated from time to time. Thus, the message code is updated from time to time when the updating of the key code performed from time to time. This maintains high confidentiality of the key code that is used to generate the message code and maintains the confidentiality of the generation source of the message code.

(4) The initial key, which is held in advance in a plurality of nodes and used when initially generating the authentication code, and the update key, which is generated from time to time whenever the communication of the communication data is performed, are used as the key code. The updating unit 120 generates the message code used in the initial communication of the communication data by performing an operation on the initial key and a random code, which includes a predetermined random number. The updating unit 120 updates the generated authentication code using the update key, which is generated from time to time. Thus, the message code is generated using the initial key, which is held in advance by only the authorized on-board controllers 100A to 100D, and the random code. Further, the message code is generated (updated) whenever the data communication is performed. Thus, as long as the confidentiality of the initial key and the random code can be ensured, high confidentiality can be maintained for the message code that is generated based on the initial key and the random code transmitted in the network.

(5) The authenticating unit 140 acquires the communication data, to which the message code is added, from a communication peer when authenticating the communication peer. The authenticating unit 140 restores the message code added to the acquired communication data to the random code through the operation of the message code and the key code (initial key, update key) held by the on-board controller 100A to 100D. The authenticating unit 140 verifies the communication data, to which the message code is added, by comparing the restored random code and the random code distributed in advance by the representative on-board controller 100A. Thus, the restoration and comparison of the random codes allows for the checking of whether the communication data has been tampered with and verifies the transmission source of the communication data.

(6) The authenticating unit 140 arranged in each of the on-board controllers 100B to 100D acquires the message code generated by the representative on-board controller 100A prior to the authentication of the communication peer. The authenticating unit 140 restores the message code to the random code using the key code (initial key, update key) held in advance by the on-board controller 100B to 100D including the authenticating unit 140 to acquire the random code used to verify the communication data. Thus, the random code distributed prior to the communication of the communication data is held by the on-board controller 100A to 100D with high confidentiality. This verifies the random code and the communication data using the random code in addition to the transmission source of the communication data with a higher degree of freedom.

(7) The on-board controller 100A transmitting the communication data distributes the translation code, which configures the change code, to the on-board controller 100B to 100D together with the message code added to the communication data. The on-board controller 100B to 100D, to which the communication data is transmitted, acquires the translation code for updating the message code whenever the data communication is performed. This allows each of the on-board controllers 100B to 100D to update the key code (initial key, update key) using the acquired translation code. Further, each of the on-board controllers 100B to 100D can generate the message code based on the updated key code. Thus, each on-board controller 100B to 100D can maintain the confidentiality of the next communication data by simply adding the generated message code to the communication data to transmit next. Thus, the updating of the message code can be smoothly performed at the same time as when the transmission process of the communication data is completed.

(8) The on-board controllers 100A to 100D arranged in the vehicle to configure the vehicle network is selected as a plurality of nodes. The updating unit 120 and the adding unit 130 are arranged in each of the on-board controllers 100A to 100D. The updating unit 120 arranged in each of the on-board controllers 100A to 100D synchronously updates the authentication code whenever the communication data is transmitted and received through the vehicle network. Thus, even in the on-board controllers 100A to 100D having limited computation capacities, verification is performed with high reliability on the communication data and the transmission source of the communication data using the message code. This maintains high reliability of the vehicle network, which requires a high level of security.

(9) The initial key and the update key are used as the key code. Two types of codes, namely, the random code and the translation code, are used as the change code that changes the key code. Thus, the message code is generated based on a plurality of types of codes, and deciphering of the message code is further difficult.

(10) Whenever the data transmission ends, the translation code is updated. Thus, it becomes further difficult to find the message code generated through the recursive operation of the translation code and the update key. Therefore, even if a previously used message code is acquired in an unauthorized manner, it becomes further difficult to predict from such a message code the next message code.

Second Embodiment

Figure 7:
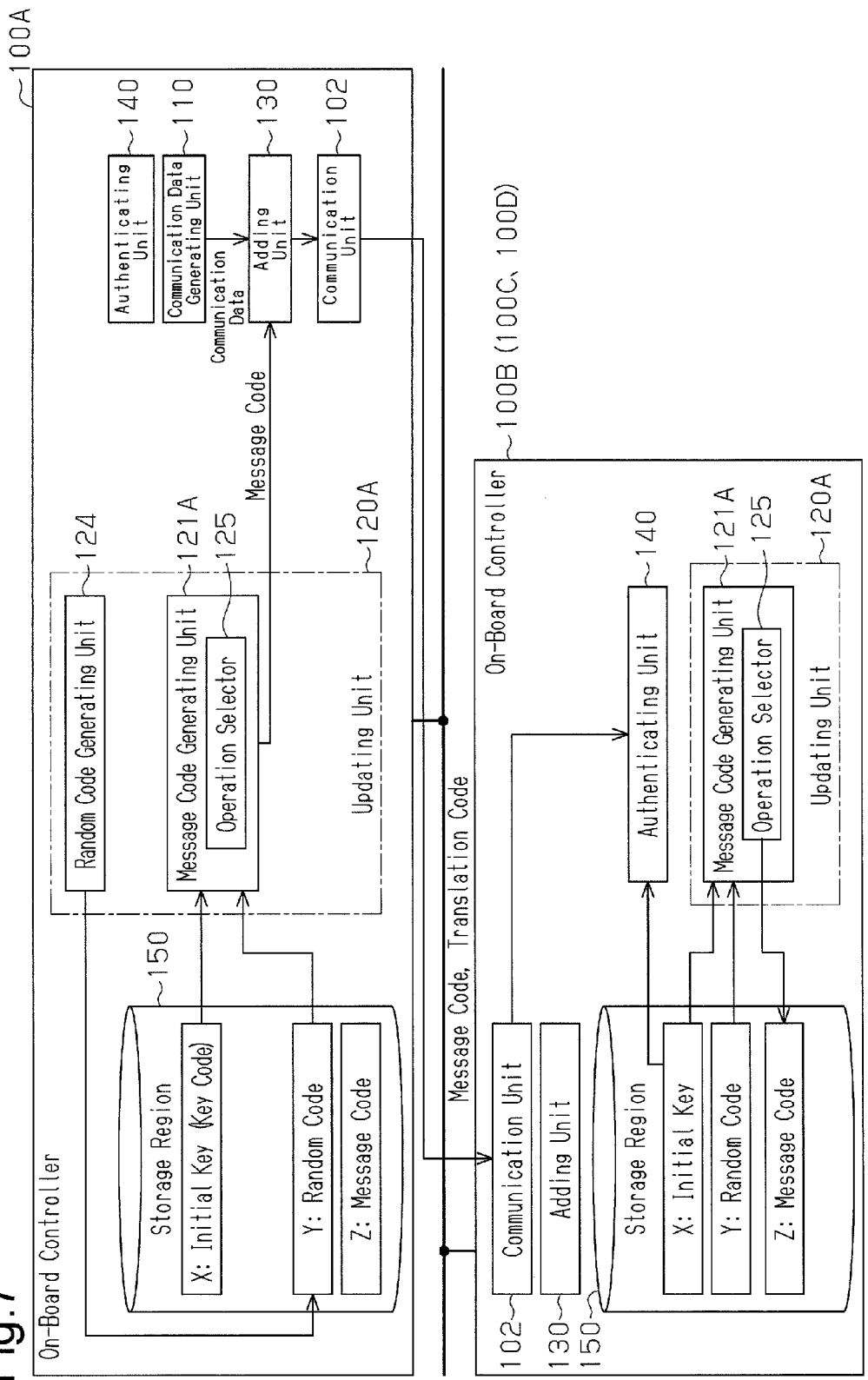
FIG. 7 is a schematic block diagram showing the configuration of an on-board controller including an updating unit and an adding unit in a second embodiment of an authentication system and an authentication method according to the present invention.

A second embodiment of an authentication system and an authentication method according to the present invention will now be described with reference to FIGS. 7 and 8, which are drawings corresponding to FIGS. 2 and 4, focusing on differences from the first embodiment. The authentication system and the authentication method in the present embodiment basically have the same configuration as the first embodiment. In FIG. 7, same reference numerals are given to those components that are the same as the corresponding components of the first embodiment. Such components will not be described.

In the present embodiment, the updating protocol sets the protocol for updating the message code using a key code, which includes an initial key, and a change code, which includes a random code.

As shown in FIG. 7, an updating unit 120A of the present embodiment does not include the translation code generating unit 123. A message code generating unit 121A configuring the updating unit 120A of the present embodiment includes an operation selector 125 that updates an operation process for generating the message code whenever data communication ends.

The operation of the authentication system and the authentication method according to the present embodiment will now be described with reference to FIG. 8.

Figure 8:
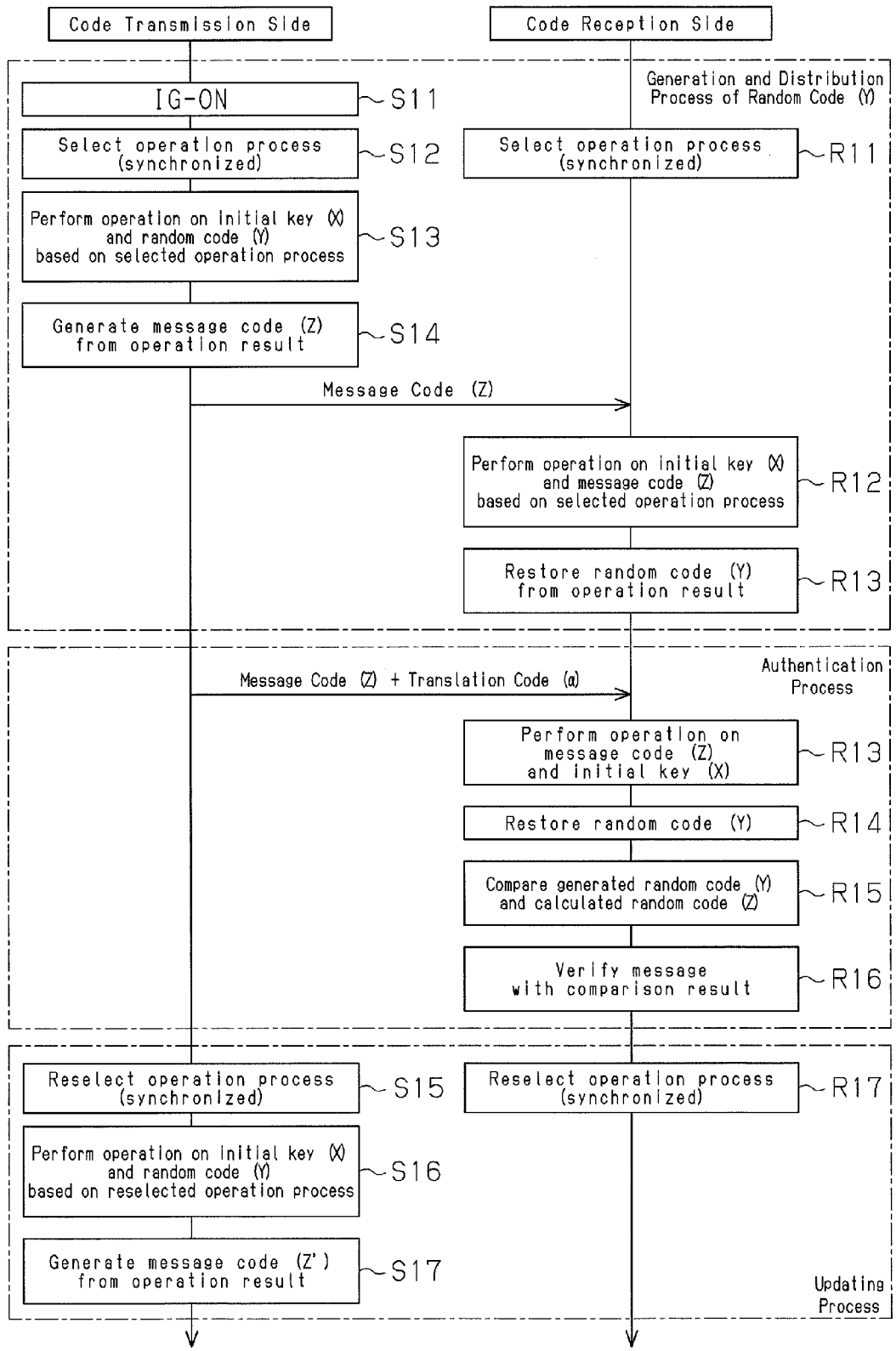
FIG. 8 is a sequence chart showing one example of the procedures for updating a key code and a message code with the updating unit and the procedures for performing authentication with an authenticating unit.

As shown in FIG. 8, for example, when the ignition key of the vehicle is switched from OFF to ON (S11), the on-board controller 100A, which is the transmission subject of the communication data, executes the distribution process of the random code. In the distribution process of the present embodiment, for example, the on-board controller 100A first selects the operation process for generating the message code (S12). The on-board controller 100A, for example, randomly selects the operation process from three types of operation processes, namely, the OR operation, the AND operation, and the OR operation. In synchronization with the selection, the on-board controller 100B to 100D selects the same operation process as the operation process selected by the on-board controller 100A (R21). Such selection of the operation process is performed, for example, by referring to data indicating a selecting rule of the operation process shared in advance among by on-board control devices 100A to 100D.

In the on-board controller 100A, an operation is performed using the initial key and the random code based on the selected operation process (S13). The message code is generated from the operation result (S14). Then, the generated message code is distributed from the on-board controller 100A to the on-board controllers 100B to 100D that are connected to the vehicle network.

When receiving the message code, each of the on-board controllers 100B to 100D performs the synchronously selected operation process on the message code and the initial key, which is held in advance by each of the on-board controllers 100B to 100D (R12). The message code is restored to the random code through the operation (R13).

After performing authentication based on the restored random code and completing the initial data communication, the operation process is reselected in each of the on-board controllers 100A to 100D (S15, R17). In this case, an operation process that differs from the previously selected operation process is selected.

When, for example, second and subsequent communications are performed after the ignition key is turned ON, the operation is performed using the initial key and the random code based on the reselected operation process (S16).

In this case, the initial key and the random code used in the operation are the same as the previous operation, but the operation process differs from the previous operation. Thus, the message code generated from the operation result of the initial key and the random code differs from the previously generated message code.

The message code newly generated in this manner is then added to the communication data, which is transmitted to the communication peer (S17). By reselecting the operation process whenever the data communication ends, the message code added to the communication data dynamically changes.

As described above, the authentication system and the authentication method in the present embodiment have the above-described advantages (1) and (8) and also have the following advantage in lieu of advantages (2) to (7), (9), and (10).

(2A) The on-board controllers 100A to 100D select the operation process that is used to generate the message code whenever the data communication is completed. Thus, whenever the data communication is performed, the message code generated by performing an operation with the initial key and the random key dynamically changes. This reduces risks when caused by communication data and the message code, which is used to verify the communication data, and maintains the verification accuracy of the message code at a desired level. Furthermore, in the present embodiment, the message code dynamically changes by simply changing the operation process for generating the message code. Thus, the message code is further easily changed.

Third Embodiment

Figure 9:
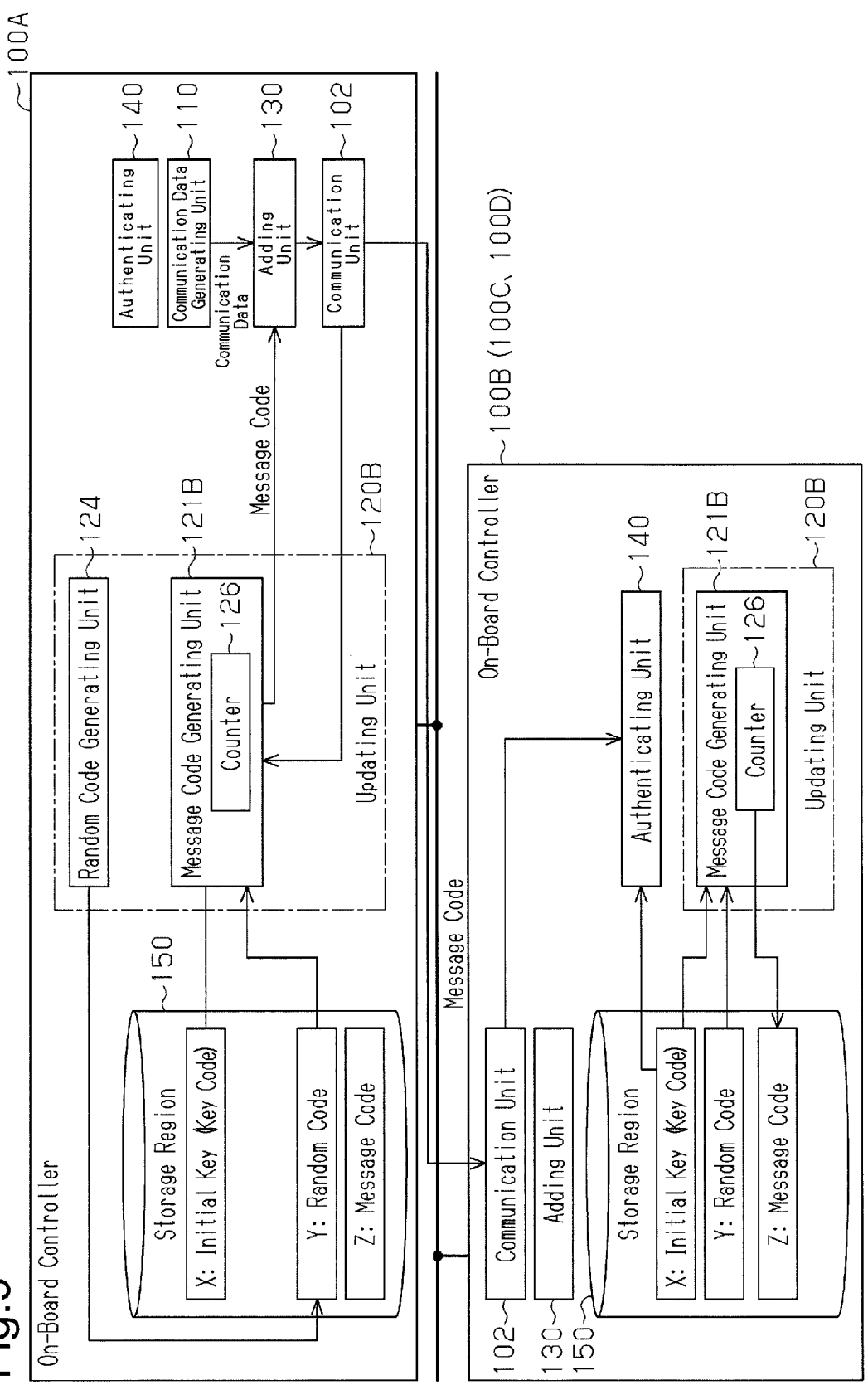
FIG. 9 is a schematic block diagram showing the configuration of an on-board controller including an updating unit and an adding unit in a third embodiment of an authentication system and an authentication method according to the present invention.
Figure 10:
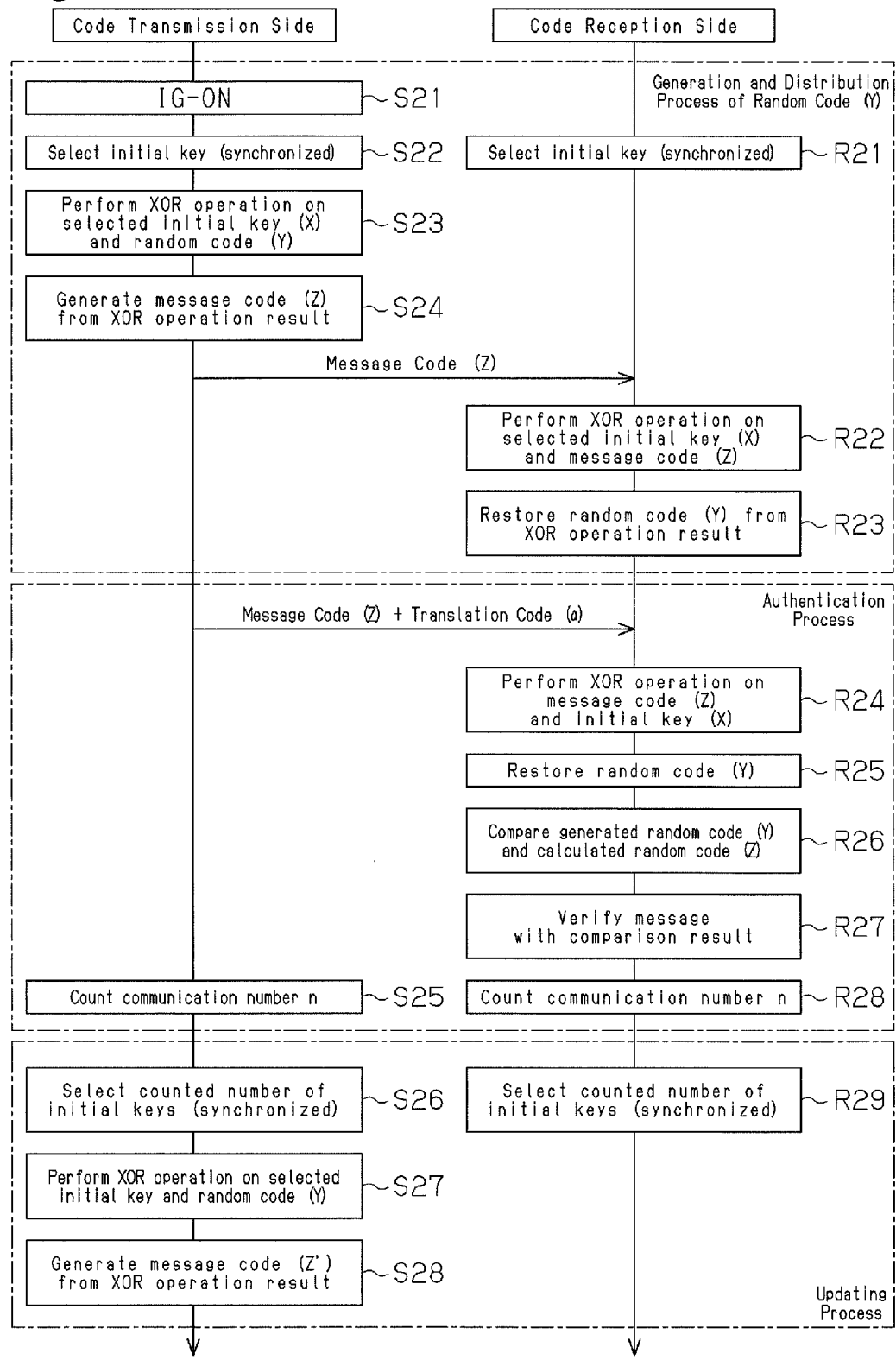
FIG. 10 is a sequence chart showing one example of the procedures for updating a key code and a message code with the updating unit and the procedures for performing authentication with an authenticating unit.

A third embodiment of an authentication system and an authentication method according to the present invention will now be described with reference to FIGS. 9 and 10, which are drawings corresponding to FIGS. 2 and 4, focusing on differences from the first embodiment. The authentication system and the authentication method in the present embodiment basically have the same configuration as the first embodiment. In FIGS. 9 and 10, same reference numerals are given to those components that are the same as the corresponding components of the first embodiment. Such components will not be described.

In the present embodiment, the updating protocol sets the protocol for updating the message code using a key code, which includes an initial key, and a change code, which includes a random code.

As shown in FIG. 9, an updating unit 120B of the present embodiment does not include the translation code generating unit 123. A message code generating unit 121B configuring the updating unit 120B of the present embodiment includes a counter 126 that counts the number of data communications based on the transmission terminating information of the communication data input from the communication unit 102.

The storage regions 150 of the on-board controllers 100A to 100D in the present embodiment share and save, for example, a plurality of different initial keys.

The operation of the authentication system and the authentication method in the present embodiment will now be described with reference to FIG. 10.

As shown in FIG. 10, when the ignition key of the vehicle is switched from OFF to ON (S21), for example, the on-board controller 100A, which is the transmission subject of the communication data, executes the distribution process of the random code. In the distribution process of the present embodiment, for example, the on-board controller 100A first selects one initial key from the initial keys held by the on-board controller 100A (S22). In synchronism with the key selection, the on-board controllers 100B to 100D select the initial key that is the same as the initial key selected by the on-board controller 100A (R21). Such synchronized selection is performed, for example, by referring to data specifying the selecting rule of the initial key held by the on-board controllers 100A to 100D.

In the on-board controller 100A, the selected initial key and the random code undergo, for example, an OR operation (S23). The message code is generated from the operation result (S24). Then, the generated message code is distributed from the on-board controller 100A to the on-board controllers 100B to 100D and the like, which are connected to the vehicle network.

When receiving the message code, each of the on-board controllers 100B to 100D, for example, perform an OR operation on the message code and the synchronously selected initial key (R22). The message code is restored to the random code through the operation (R23).

When authentication, which is based on the restored random code, is performed (R24 to R27) and the initial data communication is completed, each of the on-board controllers 100A to 100D counts the number of communications, for example, after the ignition key is turned ON (S25, R28).

In each of the on-board controllers 100A to 100D, a number of initial keys corresponding to the counted number of communications are selected (S26, R29). For example, assuming that the initial data communication has been completed, one initial key is further selected from the storage region 150.

When a second or subsequent communication is performed after the ignition key is turned ON, for example, an operation is performed using the initial key selected during the initial communication (S22, R22), at least one new initial key selected when the initial communication ends (S26, R29), and the random code (S27).

In this case, the number of initial keys used for the operation differs from the previous operation. Thus, the message code generated from the operation result of each initial key and the random code differs from the previously generated message code.

The message code newly generated in the above manner is added to the communication data (S28), which is transmitted to the communication subject. As the number of initial keys used for the generation of the message code changes according to the number of communications, the message code added to the communication data dynamically changes.

When the number of communications reaches, for example, the number of held initial keys, the number of initial keys used for the operation of the message code is reset. The number of initial keys used for the operation of the message code is increased until, for example, the number of communications reaches the held number of initial keys again.

As described above, the authentication system and the authentication method in the present embodiment have the above-described advantages (1) and (8) and also have the following advantage effect in lieu of advantages (2) to (7), (9), and (10).

(2B) The on-board controllers 100A to 100D generate the message code using a number of initial keys corresponding to the number of communications. Thus, whenever the data communication is performed, the message code generated based on one or a plurality of initial keys dynamically changes. This reduces risks when using the message code to verify the communication data and the transmission subject of the communication data, and the verification accuracy by the message code is maintained in a desired manner. Furthermore, in the present embodiment, the message code dynamically changes by simply changing the number of initial keys for generating the message code. Thus, the message code can be changed further easily.

Fourth Embodiment

Figure 11:
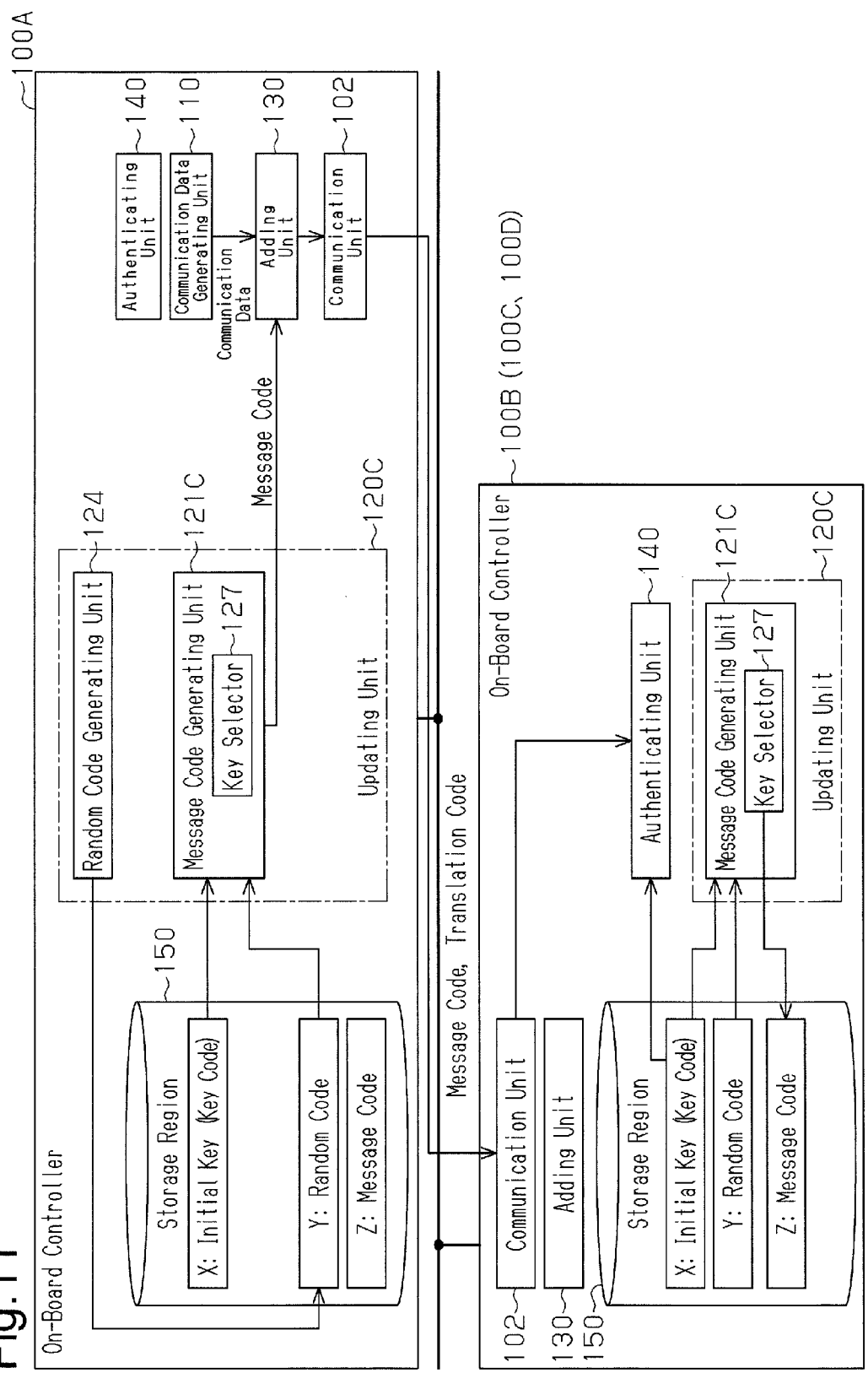
FIG. 11 is a schematic block diagram showing the configuration of an on-board controller including an updating unit and an adding unit in a fourth embodiment of an authentication system and an authentication method according to the present invention.
Figure 12:
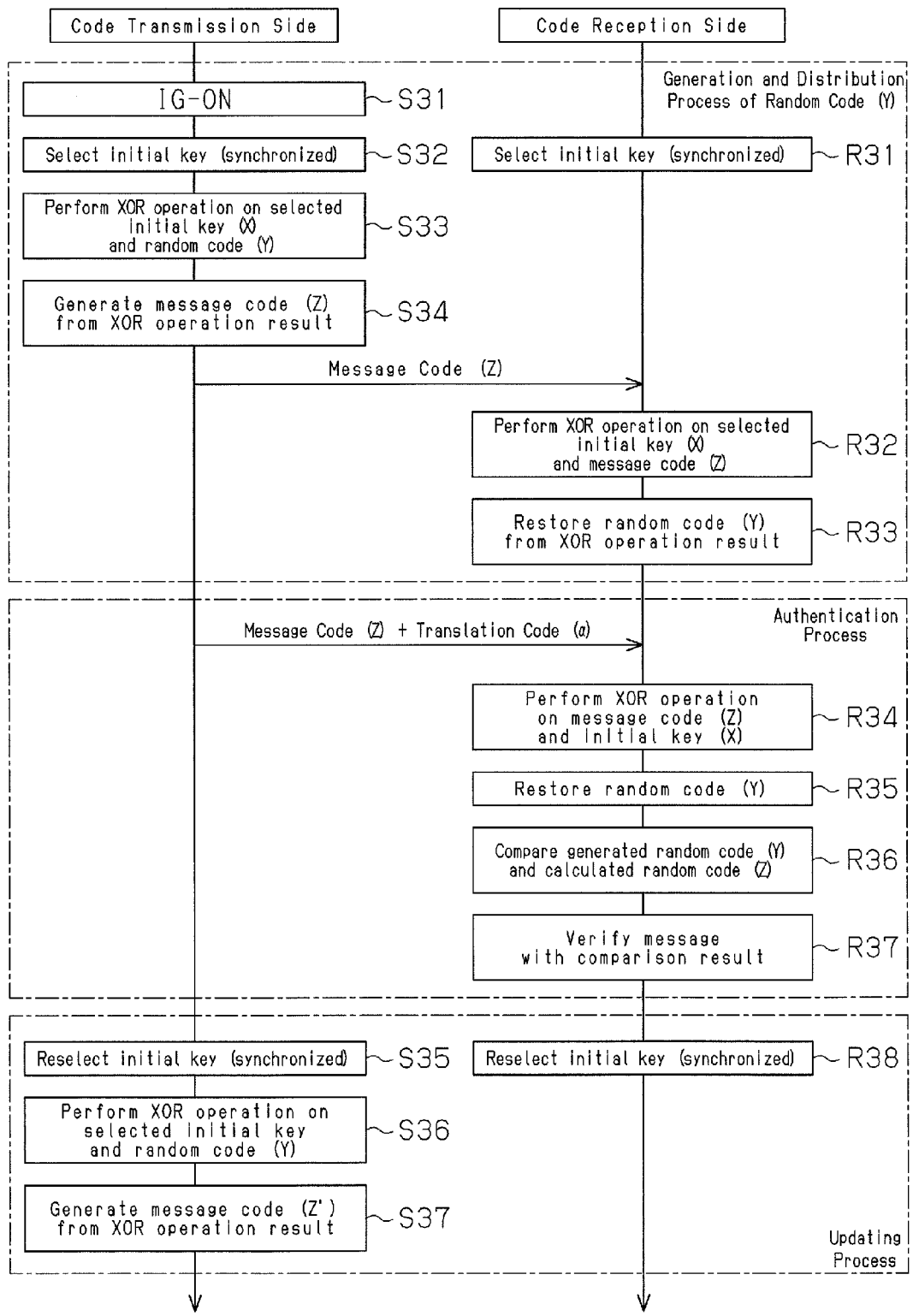
FIG. 12 is a sequence chart showing one example of the procedures for updating a key code and a message code with the updating unit and the procedures for performing authentication with an authenticating unit.

A fourth embodiment of an authentication system and an authentication method according to the present invention will now be described with reference to FIGS. 11 and 12, which are drawings corresponding to FIGS. 2 and 4, focusing on differences from the first embodiment. The authentication system and the authentication method according to the present embodiment basically have the same configuration as the first embodiment. In FIGS. 11 and 12, same reference numerals are given to those components that are the same as the corresponding components of the first embodiment. Such components will not be described.

In the present embodiment, the updating protocol sets the protocol for updating a message code using a key code, which includes an initial key, and a change code, which includes a random code.

As shown in FIG. 11, an updating unit 120C of the present embodiment does not include the translation code generating unit 123. A message code generating unit 121C configuring the updating unit 120C of the present embodiment includes a key selector 127 that selects an initial key from a plurality of different initial keys saved in the storage region 150 to generate the message code.

The operation of the authentication system and the authentication method in the present embodiment will now be described with reference to FIG. 12.

As shown in FIG. 12, when the ignition key of the vehicle is switched from OFF to ON (S31), for example, the on-board controller 100A, which is the transmission subject of the communication data, executes the distribution process of the random code. In the distribution process of the present embodiment, for example, the on-board controller 100A first selects one initial key from a plurality of different initial keys held by the on-board controller 100A (S32). In synchronization with the key selection, the on-board controllers 100B to 100D select the same initial key as the initial key selected by the on-board controller 100A (R31). Such synchronized selection is performed, for example, by referring to data specifying the selecting rule of the initial key held by the on-board controllers 100A to 100D.

In the on-board controller 100A, the selected initial key and the random code undergo, for example, an OR operation (S33). The message code is generated from the operation result (S34). The, the generated message code is distributed from the on-board controller 100A to the on-board controllers 100B to 100D and the like, which are connected to the vehicle network.

When receiving the message code, each of the on-board controllers 100B to 100D, for example, performs an OR operation on the message code and the synchronously selected initial key (R32). The message code is restored to the random code through the operation (R33).

In this manner, when the authentication is performed based on the restored random code (R34 to R37) and the initial data communication is completed, the next initial key is reselected in each of the on-board controllers 100A to 100D (S35, R38). In this case, an operation process that differs from the previously selected initial key is selected.

For example, if a second or subsequent communication is performed after the ignition key is turned ON, the operation is performed using the reselected initial key and the random code (S36).

In this case, the initial key used for the operation differs from the previous operation. The message code generated from the operation result of the reselected initial key and the random code thus differs from the previously generated message code.

The new message code generated in such a manner is added to the communication data (S37), and the communication data is transmitted to the communication subject. Since the initial key is reselected whenever the data communication is terminated, the message code added to the communication data dynamically changes.

As described above, the authentication system and the authentication method in the present embodiment have the above-described advantages (1) and (8) and also have the following advantage in lieu of advantages (2) to (7), (9), and (10).

(2C) Each of the on-board controllers 100A to 100D shares and holds a plurality of different initial keys. The on-board controllers 100A to 100D reselect the initial key used to generate the message code whenever the data communication is completed. Thus, the message code generated based on the initial key dynamically changes whenever data communication is performed. This reduces risks when using the message code to verify the communication data and the transmission subject of the communication data and maintains the verification accuracy of the message code in a desired manner. In the present embodiment, the message code is dynamically changed by simply changing the type of initial key for generating the message code. Thus, the message code is further easily changed.

Fifth Embodiment

Figure 13:
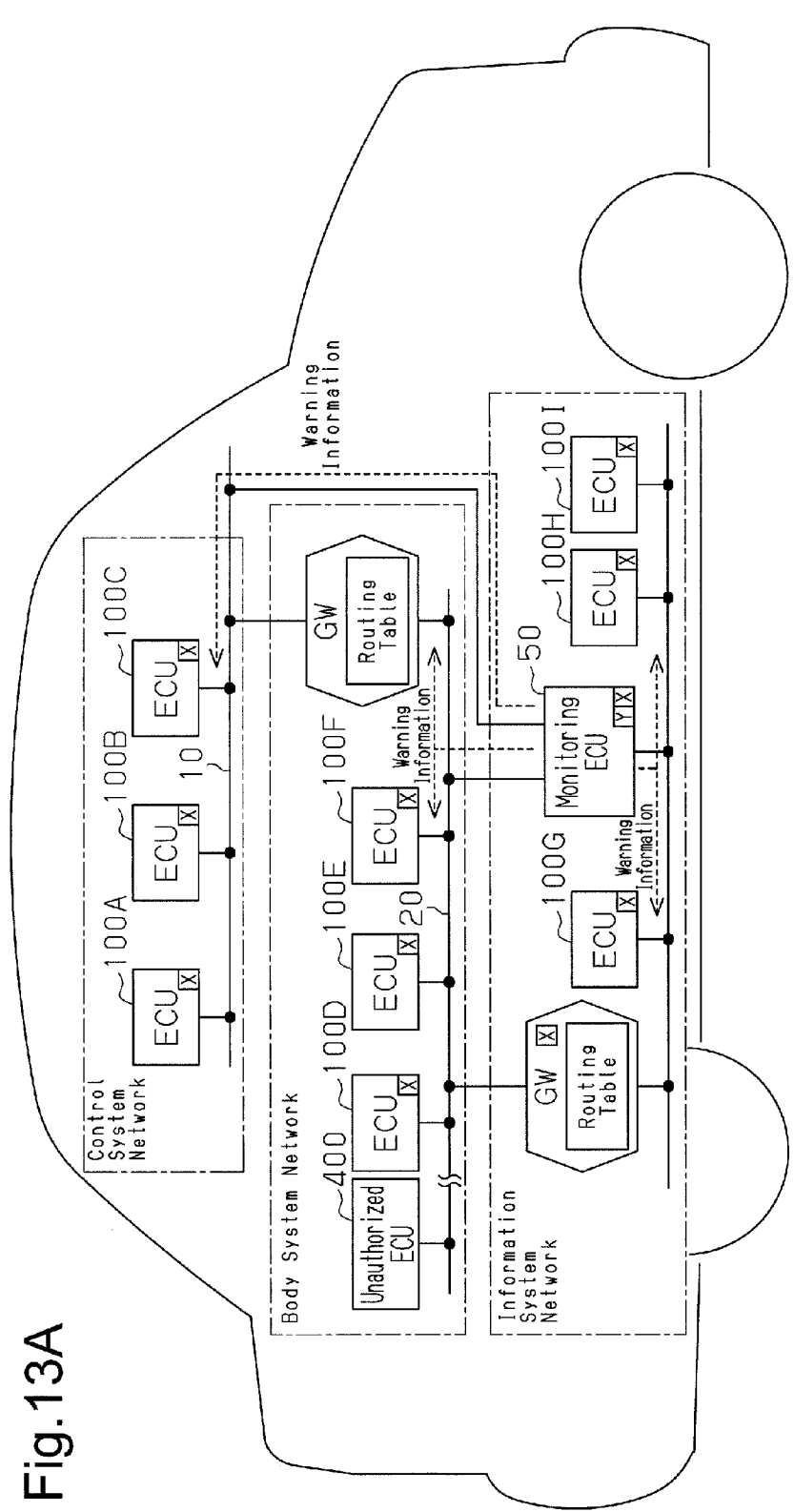
FIG. 13A is a schematic block diagram showing the configuration of an on-board controller including an updating unit and an adding unit in a fifth embodiment of an authentication system and an authentication method according to the present invention.
FIG. 13B is a view showing one example of communication data, to which a translation code for updating the key code is not added, as a comparative example.
FIG. 13C is a diagram showing one example of communication data to which a translation code for updating the key code is added.
Figure 14:
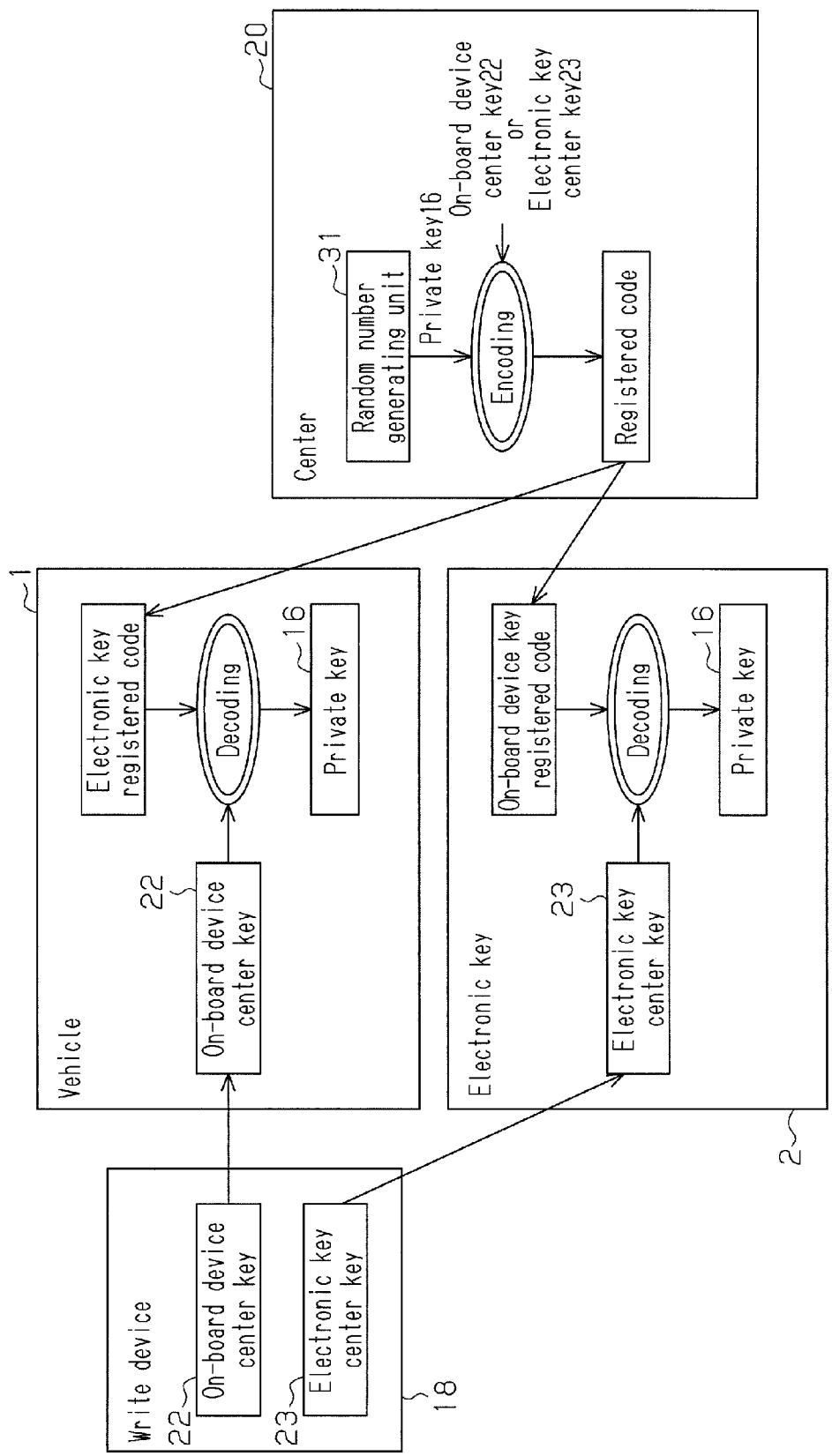
FIG. 14 is a schematic block diagram showing the configuration of a conventional authentication system.

A fifth embodiment of an authentication system and an authentication method according to the present invention will now be described with reference to FIG. 13 focusing on differences from the first embodiment. The authentication system and the authentication method according to the present embodiment basically have the same configuration as the first embodiment. In FIG. 13, same reference numerals are given to those components that are the same as the corresponding components of the first embodiment. Such components will not be described.

In the present embodiment, as described in, for example, Japanese Patent Application No. 2011-279859 (non-published document), an authentication code is added to the communication data to notify an authorized on-board controller or the like of the existence of a device that is connected to the vehicle network in an unauthorized manner.

As shown in FIG. 13A, the on-board controllers 100A to 100I, each including the updating unit 120 and the adding unit 130, are connected to the vehicle network. The vehicle network includes a monitoring on-board controller (monitoring ECU) 50 that monitors the communication data transmitted to the vehicle network. Furthermore, an unauthorized controller 400, for example, is connected in an unauthorized manner to the vehicle network.

The authorized on-board controllers 100A to 100I and the monitoring on-board controller 50 each hold a key code, which includes the initial key and the update key, and a random code. In contrast, the unauthorized controller 400 is coupled to the vehicle after shipment from the factory in an unauthorized manner and does not hold the key code and the random code.

When detecting unauthorized data transmitted by the controller 400, the monitoring on-board controller 50 specifies the unauthorized controller 400, which is the transmission source of the unauthorized data, based on an ID added to the data frame of the unauthorized data.

The monitoring on-board controller 500 generates warning information of a content that prohibits each of the on-board controllers 100A to 100I from using the unauthorized data transmitted from the specified unauthorized controller 400.

FIG. 13B shows a comparative example, in which a message code "X" is generated as, for example, data of 53 bits. The content of a message code "Z" prohibits each of the on-board controllers 100A to 100I from using the data transmitted by the unauthorized controller 400 until the cancel condition of the suppressing process is satisfied. A condition for canceling the restriction process may include, for example, a predetermined time having elapsed and the ignition key having been turned ON. The restriction process is canceled when at least one of the cancel conditions is satisfied.

After generating the message code, the monitoring on-board controller 50 writes the ID of the specified unauthorized controller 400 specified by, for example, 11 bits to the data field of the communication data. The monitoring on-board controller 50 transmits the communication data, including a data frame to which its ID is added, to the vehicle network as warning information indicating the existence of the unauthorized controller 400.

In the comparative example shown in FIG. 13B, the message code that has been used once is continuously used. Thus, the unauthorized controller 400 may acquire the message code in an unauthorized manner and use the acquired message code to impersonate the authorized on-board controllers 100A to 100I.

In contrast, the present embodiment adds the translation code to the communication data, and the key code and the message code are updated based on the translation code, as shown in FIG. 13C. Thus, the unauthorized controller 400 cannot impersonate the authorized on-board controllers 100A to 100I.

As described above, the authentication system and the authentication method according to the present embodiment have advantages (1) to (10) and also the following advantage.

(11) Each of the on-board controllers 100A to 100I and the monitoring on-board controller 50 exchange communication data, to which the message code is added, for the communication data including the warning information. This maintains the confidentiality of the communication data having a high degree of importance for is maintained in maintaining the security of the vehicle network. The message code is thus not added to communication data unless the communication data includes the warning information, and the adding process and the restoring process of the message code can be omitted when performing normal data transmission and reception.

Other Embodiments

Each of the embodiments described above may be modified in the following manner.

In each of the embodiments described above, the on-board controller 100A generates and distributes the random code as long as the ignition key of the vehicle is turned ON. Instead, the on-board controller 100A may generate and distribute the random code as long as a predetermined time has elapsed, for example.

In each of the embodiments described above, the on-board controller 100A is the transmission subject of the communication data. This is not the sole case, and for example, the on-board controller 100B to 100D may be the transmission subject of the communication data. In this case, the on-board controller 100B to 100D adds the message code and the random code to the communication data when transmitting the communication data. The device receiving the communication data verifies the communication data and the transmission subject.

In each of the first, third, fourth, and fifth embodiments, the message code is generated by performing an OR operation on the initial key and the random code. Instead, for example, various types of operations such as an OR operation and an AND operation may be performed to generate the message code.

In the first embodiment, the representative on-board controller 100A transmits the translation code generated as the change code to the on-board controllers 100B to 100D together with the communication data. Instead, the on-board controller 100A may distribute the translation code separately from the communication data. Furthermore, the on-board controller 100A may, for example, generate a plurality of different translation codes in advance, and distribute the generated different translation codes to the on-board controllers 100B to 100D. In this case, each on-board controller 100A to 100D generates the translation code used to generate the message code from the different translation codes generated in advance whenever the data communication is completed. The representative on-board controller 100A thus does not need to generate the translation code or distribute the generated translation code whenever the data communication ends.

In the first embodiment, the representative on-board controller 100A generates the translation code as the change code. The on-board controller 100A then updates the initial key based on the generated translation code. Each of the on-board controllers 100B to 100D updates the initial key based on the translation code distributed from the on-board controller 100A. Instead, any one of the on-board controllers 100A to 100D may generate and distribute the initial key. Further, each of the on-board controllers 100A to 100D may synchronously generate the same translation code.

In each of the embodiments described above, the on-board controller 100A is specified as a device representing the on-board controllers 100A to 100D. The on-board controller 100A generates and distributes the random code. Instead, any one of the on-board controllers 100B to 100D may generate and distribute the random code. For example, each of the on-board controllers 100A to 100D may hold the same random code in advance. In the same manner, each of the on-board controllers 100A to 100D may generate and update the same random code in synchronization.

In the first embodiment, the translation code configuring the change code is updated whenever data communication ends. Instead, after the translation code is generated once, the translation code may be continuously used. The translation code and the update key, which is updated whenever necessary, may undergo operations in a multiplexed manner so that the update key is updated from time to time. Further, the change code is not limited to the translation code that includes a random number and may be changed as long as it is a code for changing the message code.

In each of the embodiments described above, the transmission subject of the communication data adds the random code converted to the message code, which serves as the authentication code, to the communication data. Then, the transmission subject transmits the communication data to a transmission peer. The authenticating unit 140 verifies the communication data and the transmission source of the communication data by comparing the random code held in advance with the random code added to the communication data and converted to the message code. Instead, the transmission subject of the communication data may transmit the random code to the communication subject as the authentication code. In this case, the authenticating unit 140 compares the random code added to the communication data acquired from the transmission subject of the communication data with the random code held in advance by the on-board controller 100A to 100D including the authenticating unit 140. The authenticating unit 140 verifies the communication data and the transmission source of the communication data based on the comparison result.

In each of the embodiments described above, one random code is used. Instead, two or more random codes may be used to verify the communication data. Furthermore, in the first embodiment described above, one translation code is used to update the key code. Instead, the updating unit 120 may update the key code with a plurality of translation codes.

In each of the embodiments described above, the random code including a predetermined random number is used as an authentication code. The authenticating unit 140 verifies the communication data and the transmission source of the communication data by comparing two random codes. Instead, the authentication code may be a password or the like that is distributed in advance to the authorized on-board controller or the like.

In each of the first to fourth embodiments described above, the updating unit 120 and the adding unit 130 are arranged in the on-board controllers 100A to 100D. In the fifth embodiment described above, the updating unit 120 and the adding unit 130 are arranged in the on-board controllers 100A to 100I and the monitoring on-board controller 50. Instead, the updating unit 120 and the adding unit 130 may be arranged in a gateway GW (see FIG. 13) connected to the vehicle network, for example. In the same manner, the updating unit 120 and the adding unit 130 may be connected to the vehicle network as dedicated devices, for example.

In each of the embodiments described above, the on-board controllers connected to the vehicle network are used as nodes that transmit and receive communication data. Instead for example, various types of information terminals and various types of devices, such as personal computers, smartphones, and the like may be used as the nodes. Each information terminal and each device adds the authentication code to the communication data when transmitting or receiving the communication data through the network. Each information terminal and each device updates, from time to time, the authentication code added to the communication data. This also obtains advantages similar to advantage (1).

DESCRIPTION OF REFERENCE CHARACTERS 100A to 100I on-board controller
101 central processing unit
102 communication unit
110 communication data generating unit
120, 120A to 120C updating unit
121, 121A to 121C message code generating unit
122 key code updating unit
123 translation code generating unit
124 random code generating unit
125 operation selector
126 counter
127 key selector
130 adding unit
140 authenticating unit
150 storage region
200 DLC
300 information terminal
400 unauthorized controller

The invention claimed is:

1. An authentication system used to authenticate a plurality of nodes, wherein the plurality of nodes are connected to a network and transmit and receive communication data, wherein
the plurality of nodes share and hold a key code, which is used to generate an authentication code used to verify a transmission source of the communication data, and a change code, which is used to change the authentication code and includes a predetermined random number, wherein the plurality of nodes includes one or more of Electronic Control Units (ECUs), including:
an adding circuitry that adds the authentication code to the communication data, and
an updating circuitry that updates the authentication code by performing a predetermined operation with the key code and the change code whenever communication of the communication data ends,
wherein the updating circuitry selects a translation code, which includes a predetermined random number that serves as the change code, and executes a recursive operation on the key code using the selected translation code to update the key code from time to time and recursively generate the authentication code with the key code, which is updated from time to time, wherein
the key code includes an initial key, which is held in advance in the plurality of nodes and used when initially generating the authentication code, and an update key, which is generated in an operation performed on the initial key and the translation code from time to time whenever communication of the communication data ends; and
the updating circuitry generates an authentication code used when initially communicating the communication data by performing an operation on the initial key and a random code, which includes a predetermined random number held in advance in the plurality of nodes, and updates the generated authentication code using an update key that is generated from time to time.

2. An authentication system used to authenticate a plurality of nodes, wherein the plurality of nodes are connected to a network and transmit and receive communication data, wherein
the plurality of nodes share and hold a key code, which is used to generate an authentication code used to verify a transmission source of the communication data, and a change code, which is used to change the authentication code and includes a predetermined random number, wherein the plurality of nodes includes one or more of Electronic Control Units (ECUs), including:
an adding circuitry that adds the authentication code to the communication data,
an updating circuitry that updates the authentication code by performing a predetermined operation with the key code and the change code whenever communication of the communication data ends,
an authenticating circuitry that authenticates a node that becomes a communication peer when transmitting and receiving the communication data,
wherein
when authenticating the node that becomes a communication peer, the authenticating circuitry acquires, from the communication peer, communication data to which a message code is added, wherein the message code is generated by performing an operation on a random code, which includes a predetermined random number held in advance in the plurality of nodes, and the key code, and wherein the authenticating circuitry verifies the communication data, to which the message code is added, by comparing a random code, which is restored by performing an operation on the acquired message code and the key code held by the authenticating circuitry, with a random code, which is held in advance by a node that receives the communication data from the communication peer; and
the updating circuitry updates the message code as the authentication code.

3. The authentication system according to claim 2, wherein before authenticating a node that becomes a communication peer, the authenticating circuitry restores a message code, which is generated by performing an operation on the key code and the random code, to a random code using the key code, which is held in advance in the authenticating circuitry, to acquire a random code used to verify the communication data.

4. The authentication system according to claim 1, wherein
a node that transmits the communication data distributes the change code to a node that is a transmission peer together with an authentication code, which is added to the communication data; and
the updating circuitry updates a key code using the change code as long as a transmission process of communication data, to which the authentication code and the change code are added, is completed.

5. The authentication system according to claim 1, wherein
the plurality of nodes share and hold a key code, which is used to generate an authentication code, and a change code, which is used to change the authentication code;
an updating protocol sets a protocol for updating the authentication code with the key code and the change code; and
the updating circuitry updates the authentication code by changing a type of operation for the authentication code using the change code whenever communication of the communication data ends.

6. The authentication system according to claim 1, wherein
the updating protocol sets a protocol for updating the authentication code with the key code and the change code; and
the updating circuitry counts a number of communications of the communication data transmitted between the plurality of nodes and generates the authentication code using a number of key codes corresponding to the number of counted communications to update the authentication code.

7. The authentication system according to claim 1, wherein
the plurality of nodes includes a plurality of on-board controllers arranged in a vehicle to configure a vehicle network;
the adding circuitry and the updating circuitry are each arranged in each of the plurality of onboard controllers; and
the updating circuitry arranged in the plurality of on-board controllers synchronously update the authentication code whenever communication data is transmitted and received through the vehicle network.

8. An authentication method used to authenticate a plurality of nodes, wherein the plurality of nodes are connected to a network and transmit and receive communication data, wherein the plurality of nodes includes one or more of Electronic Control Units (ECUs), the authentication method comprising:
by adding circuitry of the ECUs, adding an authentication code, which is used to verify a transmission source of the communication data, to the communication data;
by updating circuitry of the ECUs, updating the authentication code based on a specified authentication code updating protocol whenever communication of the communication data ends;
sharing and holding a key code, which is used to generate an authentication code, and a change code, which is used to change the authentication code, in the plurality of nodes; and
setting a protocol for updating the authentication code with the key code and the change code as the updating protocol,
wherein the updating the authentication code includes selecting a translation code including a predetermined random number as the change code, and performing a recursive operation on the key code using the selected translation code to update the key code from time to time and recursively generate the authentication code with the key code, which is updated from time to time,
the method further comprising
selecting, as the key code, an initial key, which is held in advance in the plurality of nodes and used when initially generating the authentication code, and an update key, which is generated from time to time whenever the communication data is communicated by performing an operation on the initial key and the translation code; and wherein the updating the authentication code includes generating an authentication code, which is used when initially communicating communication data through an operation performed on the initial key and the random code, and updating the generated authentication code with the update key that is generated from time to time.

9. An authentication method used to authenticate a plurality of nodes, wherein the plurality of nodes are connected to a network and transmit and receive communication data, wherein the plurality of nodes includes one or more of Electronic Control Units (ECUs), the authentication method comprising:
by adding circuitry of the ECUs, adding an authentication code, which is used to verify a transmission source of the communication data, to the communication data;
by updating circuitry of the ECUs, updating the authentication code based on a specified authentication code updating protocol whenever communication of the communication data ends;
sharing and holding a key code, which is used to generate an authentication code, and change code, which is used to change the authentication code, in the plurality of nodes; and
setting a protocol for updating the authentication code with the key code and the change code as the updating protocol,
the authentication method further comprising
by authenticating circuitry of the ECUs, acquiring, when authenticating a node that becomes a communication subject, from the communication subject communication data to which a message code is added, wherein the message code is generated by performing an operation on a random code, which includes a predetermined random number held in advance in the plurality of nodes, and the key code, verifying the communication data to which the message code is added by comparing a random code, which is restored by performing an operation on the acquired message code and the key code that is held in advance, with a random code, which is held in advance by a node that receives the communication data from the communication subject, and authenticating a node that becomes the communication subject when transmitting and receiving the communication data based on the verification result;
wherein the updating the authentication code includes updating the message code as the authentication code.

* * * * *